W. C. BRIGGS.
MACHINE FOR APPLYING BANDS TO CIGARS.
APPLICATION FILED NOV. 26, 1913.
1,138,275.
Patented May 4, 1915.
20 SHEETS—SHEET 7.
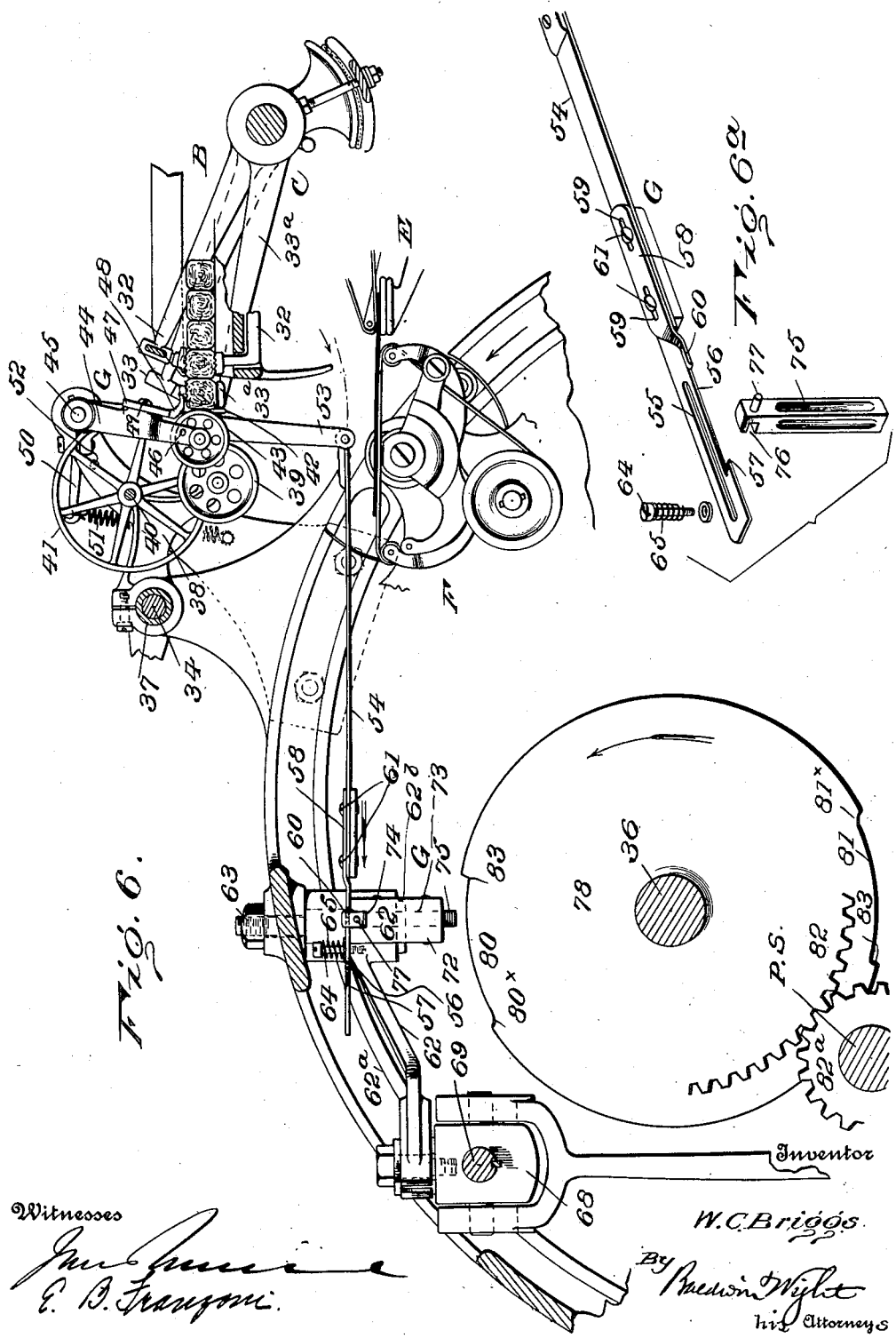
Witnesses
Inventor
W. C. Briggs.
By his Attorneys

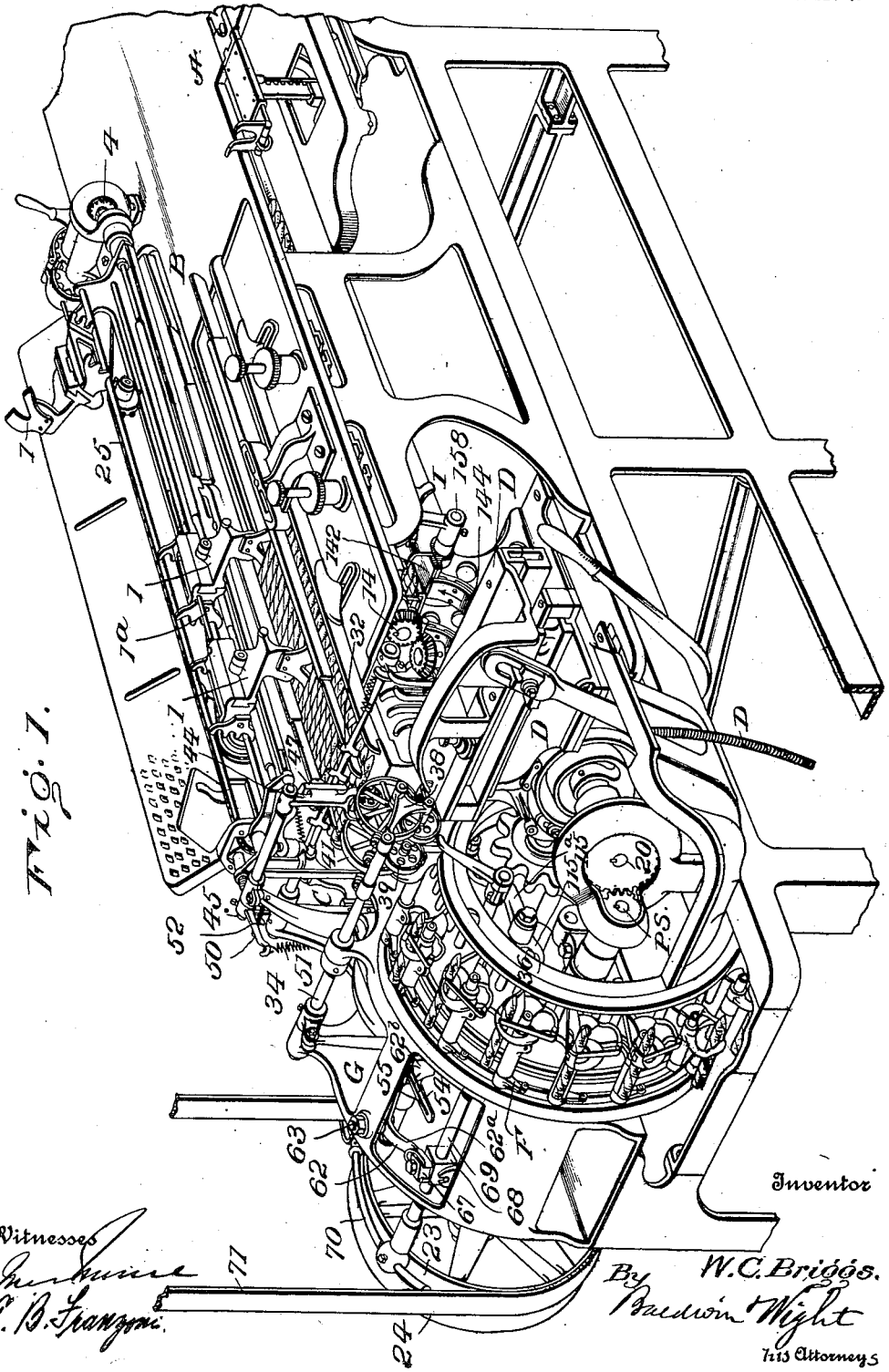

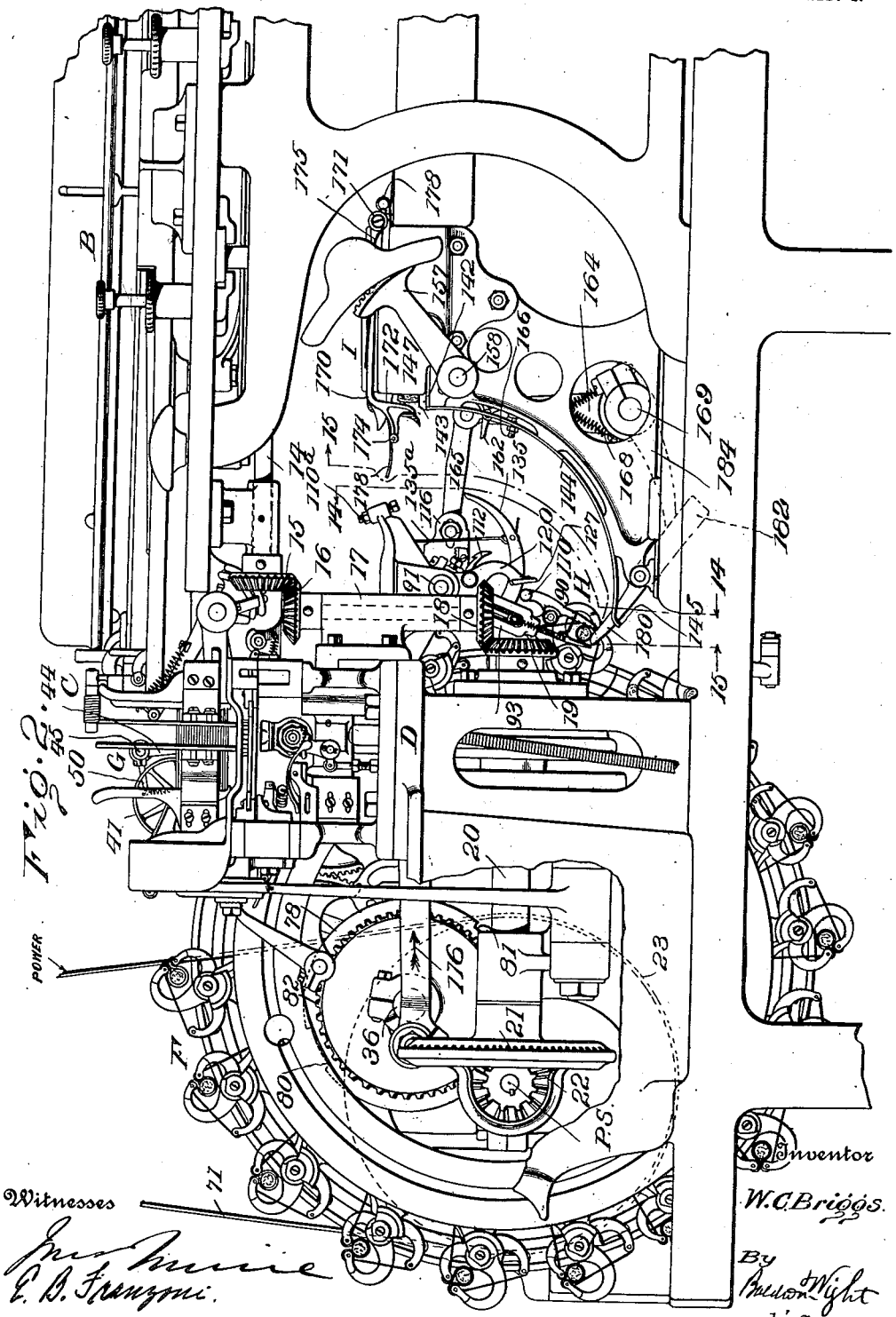

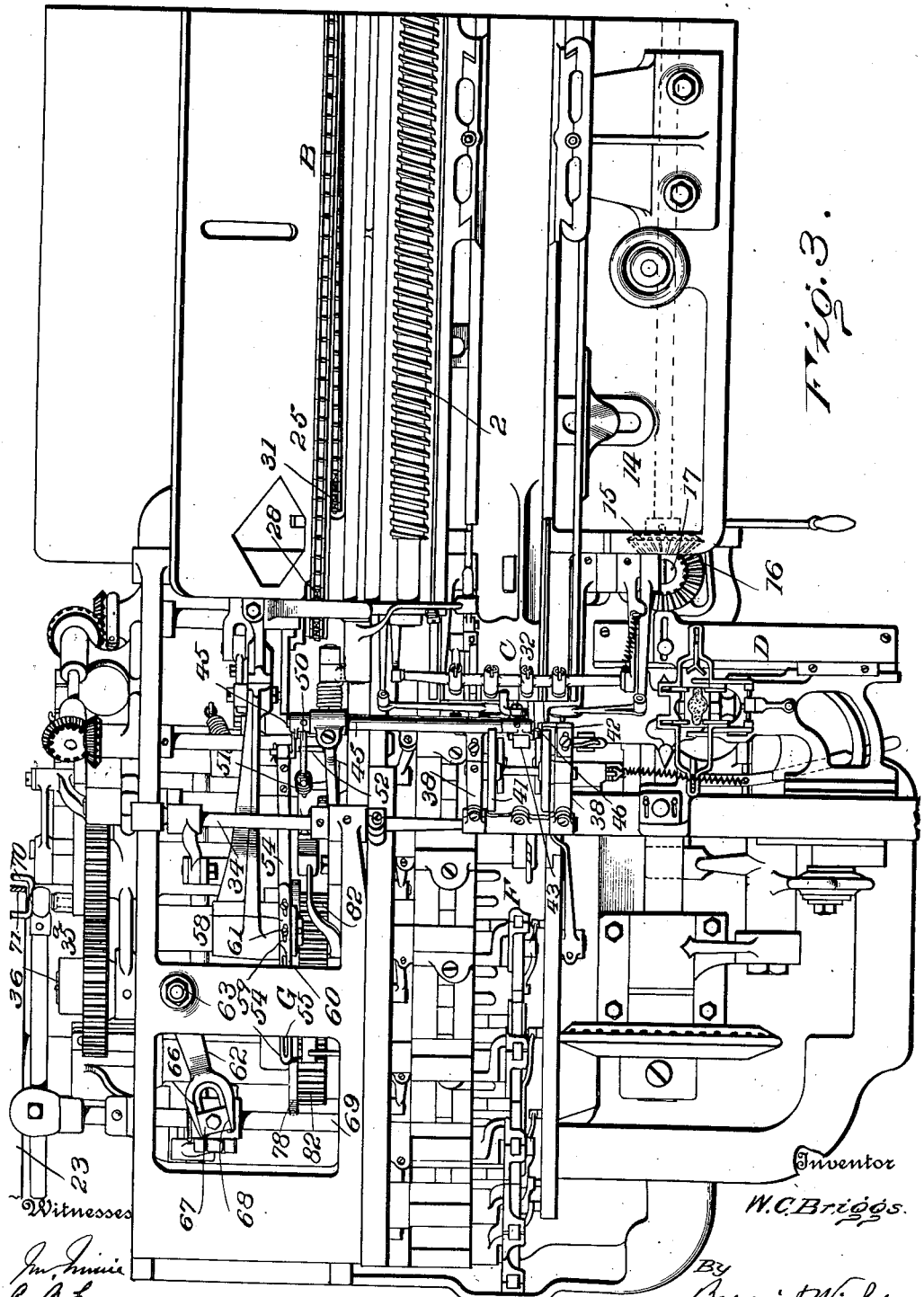

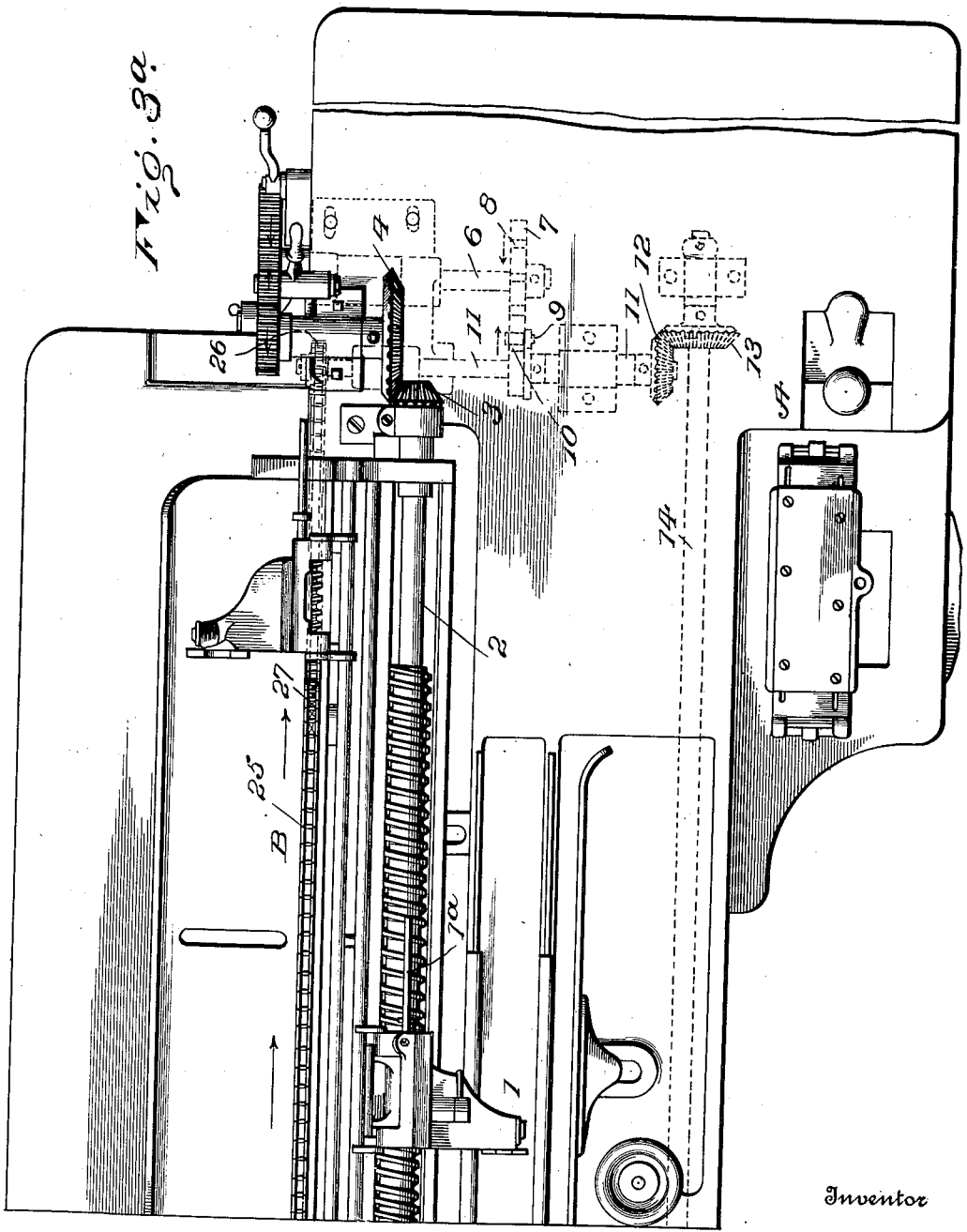

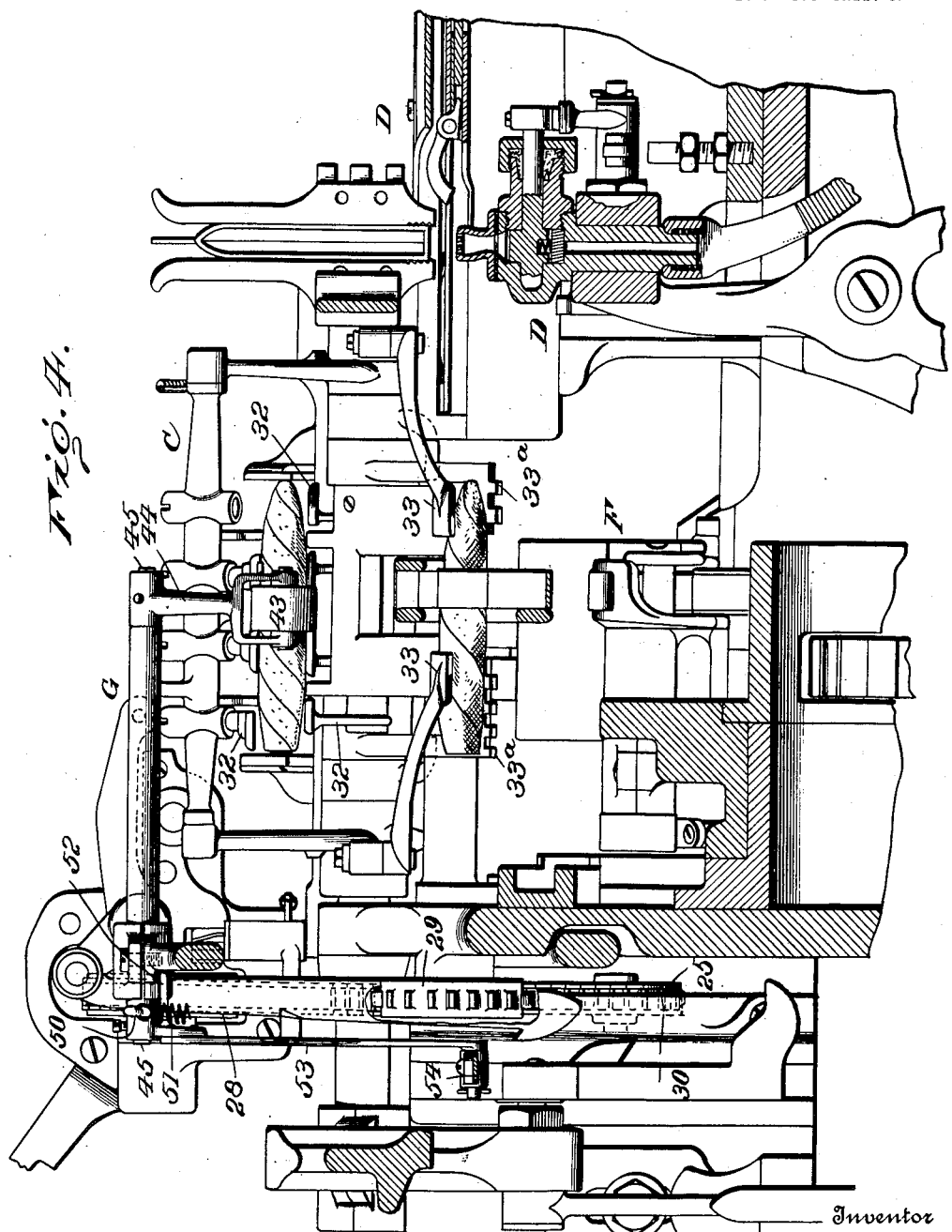

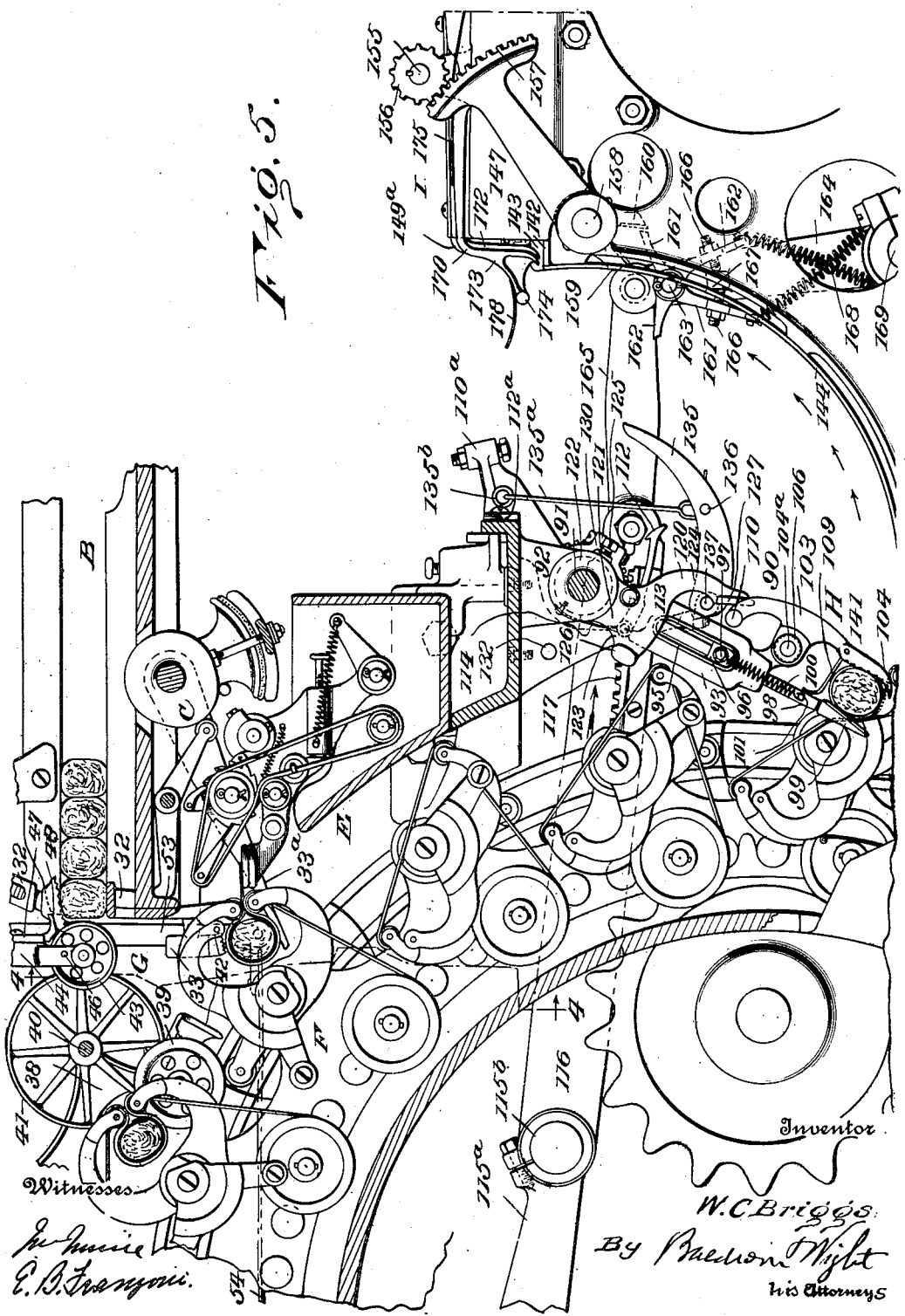

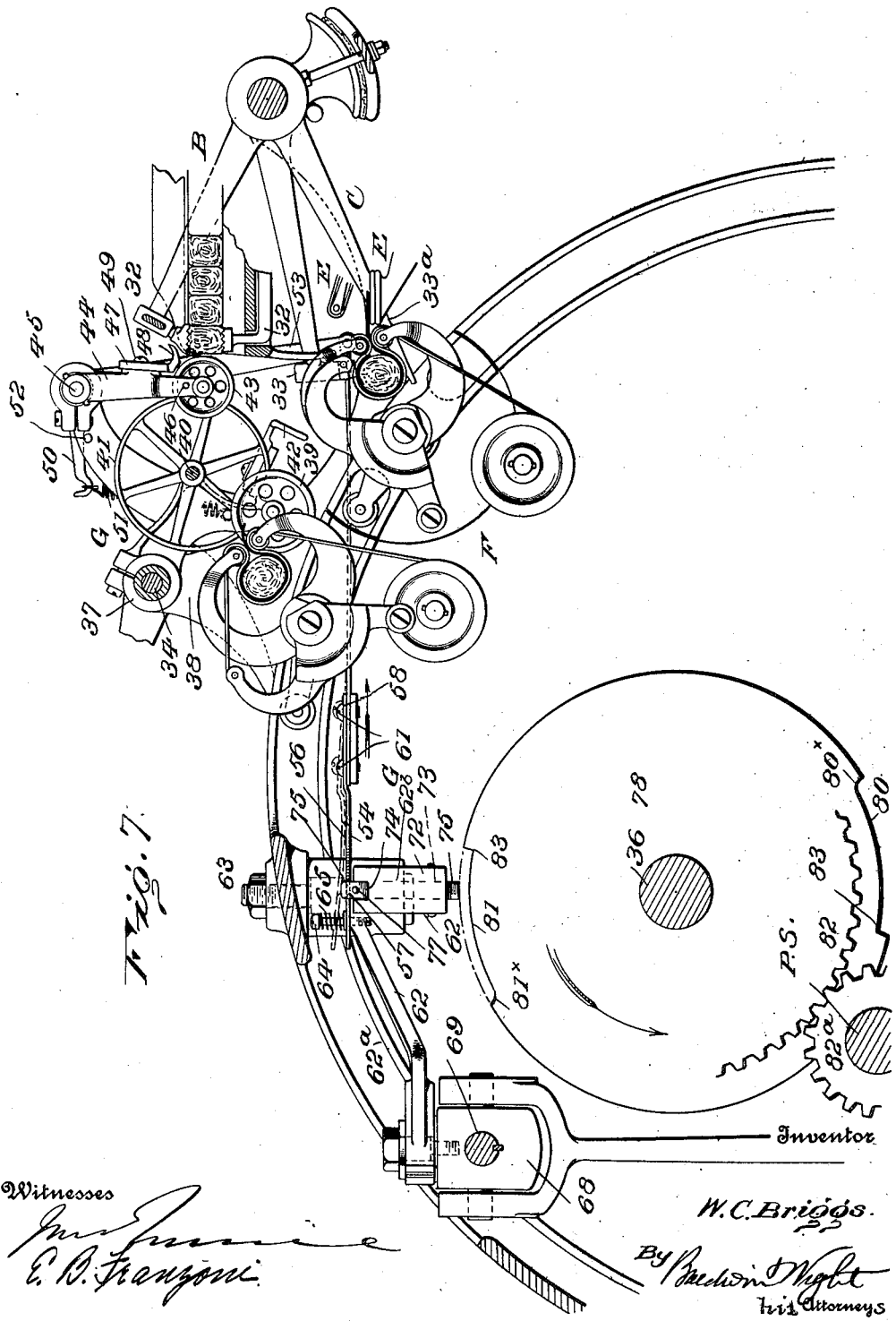

W. C. BRIGGS.
MACHINE FOR APPLYING BANDS TO CIGARS.
APPLICATION FILED NOV. 26, 1913.
1,138,275.
Patented May 4, 1915.
20 SHEETS—SHEET 9.
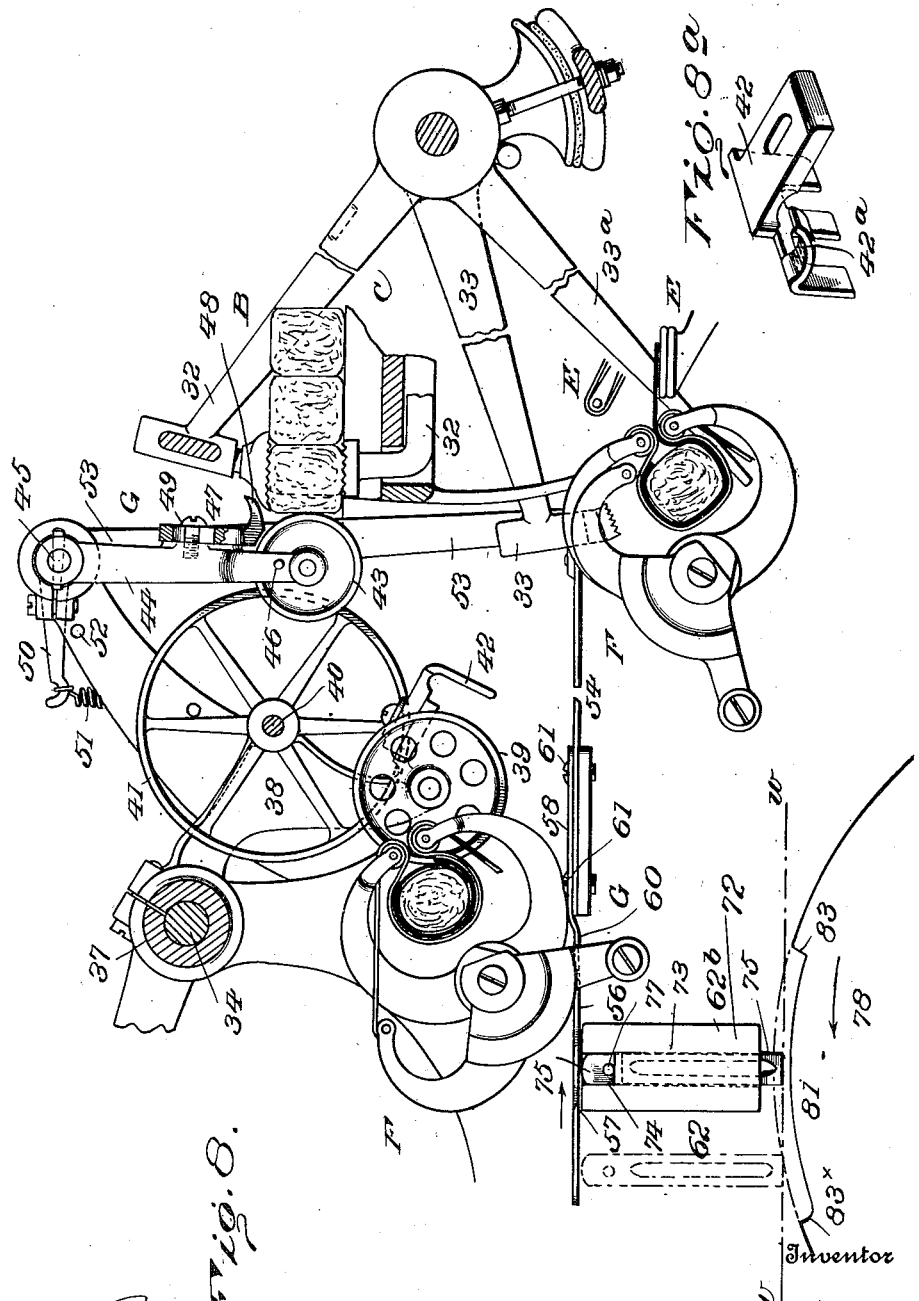

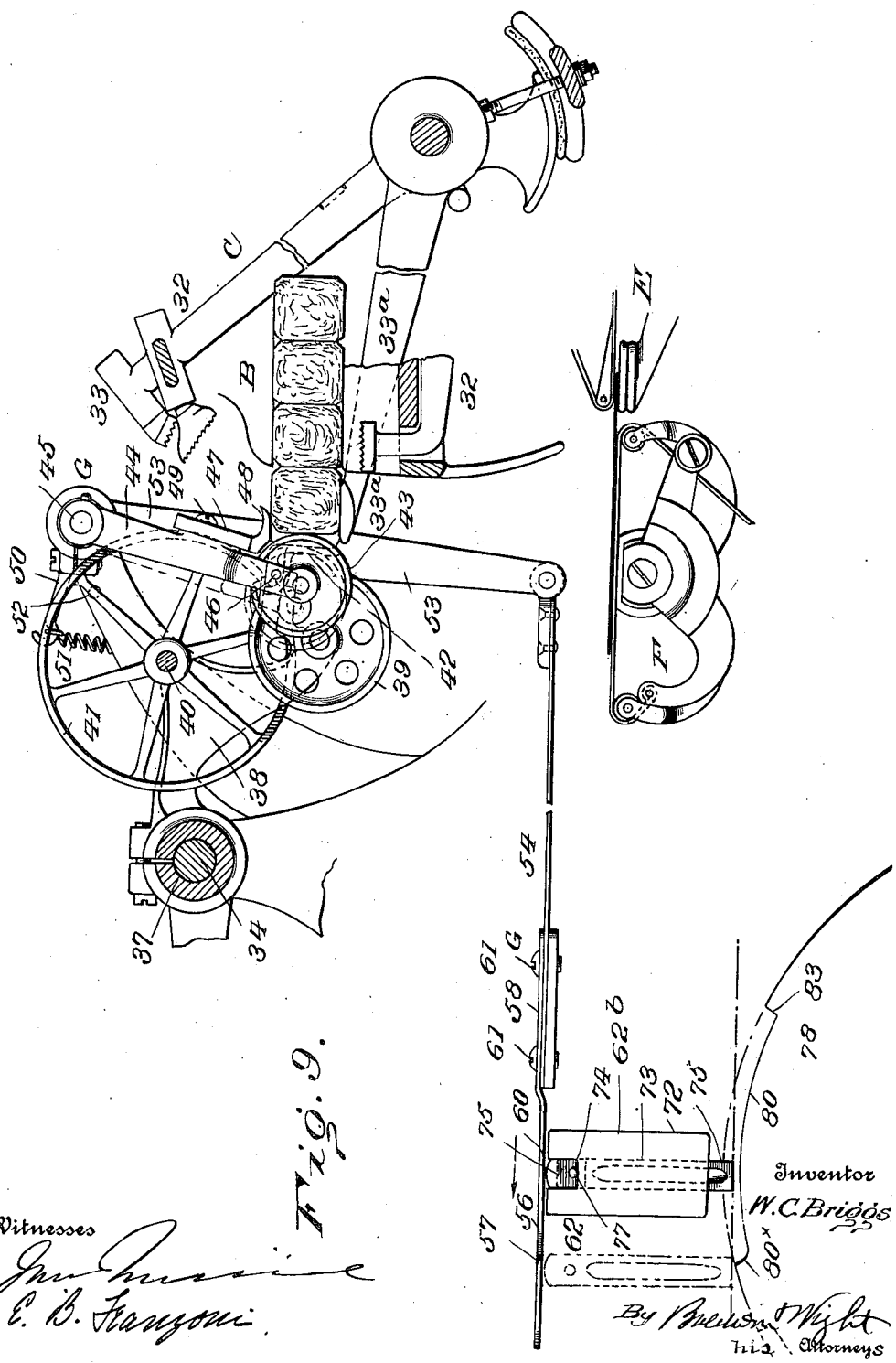

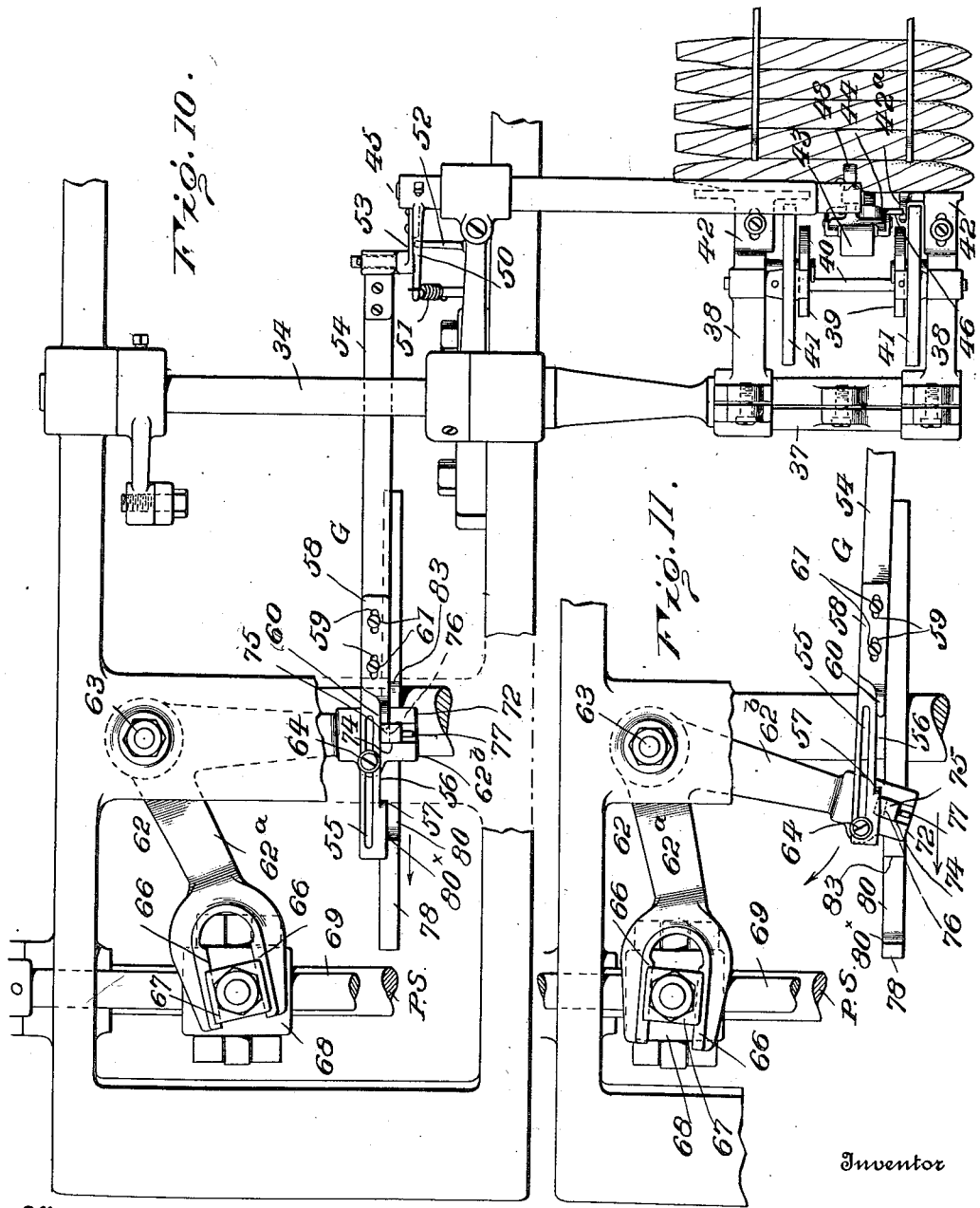

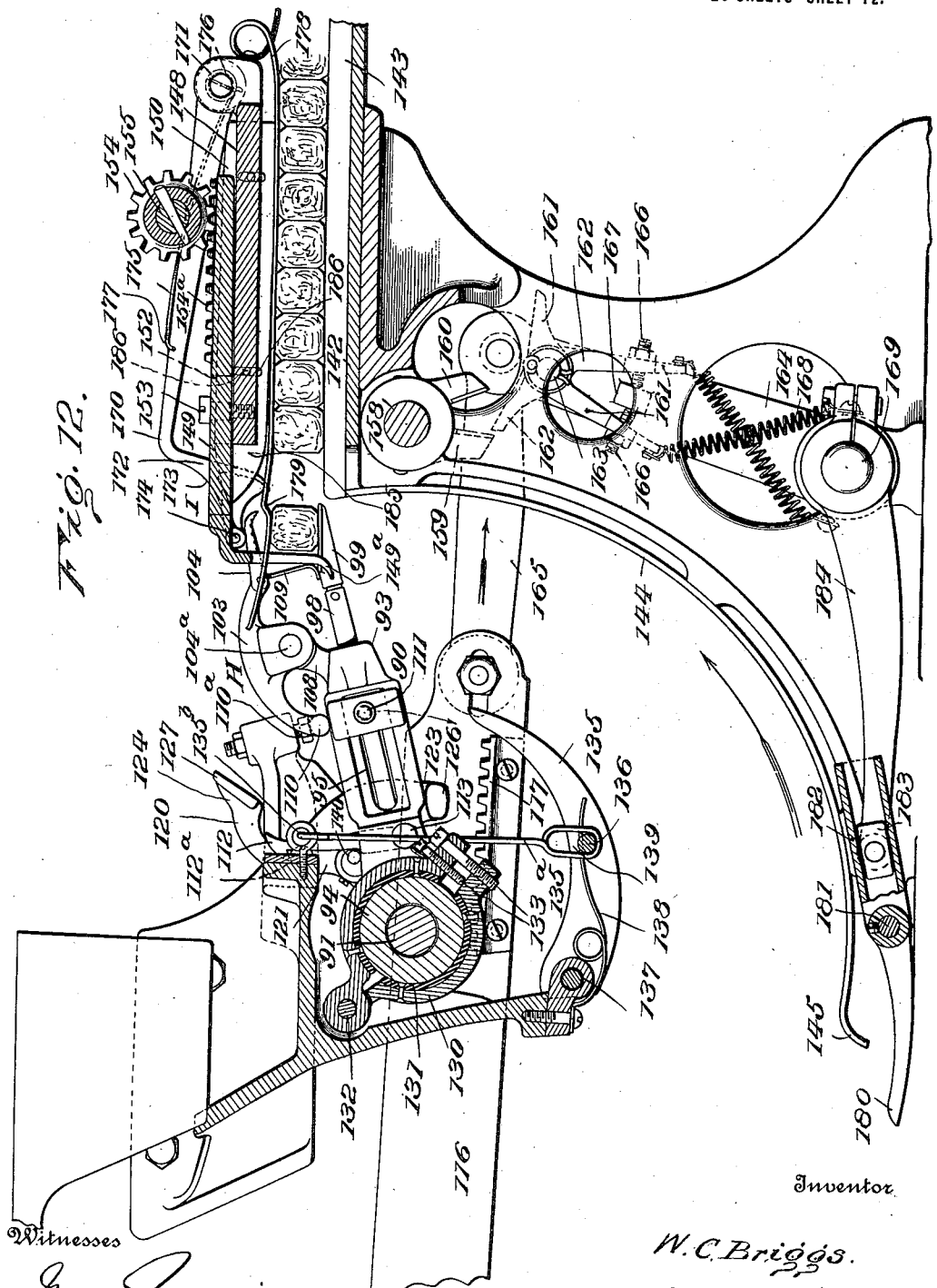

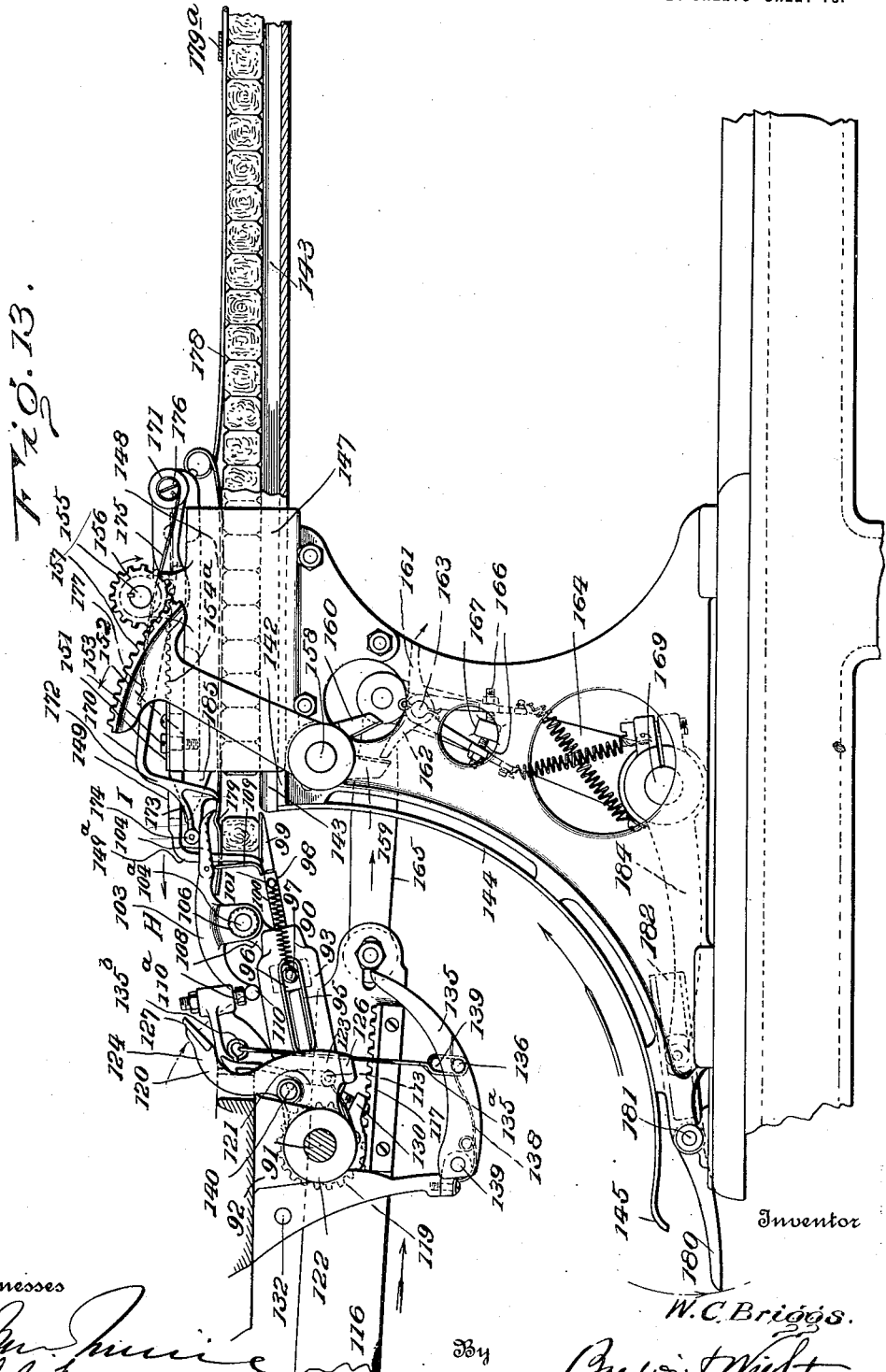

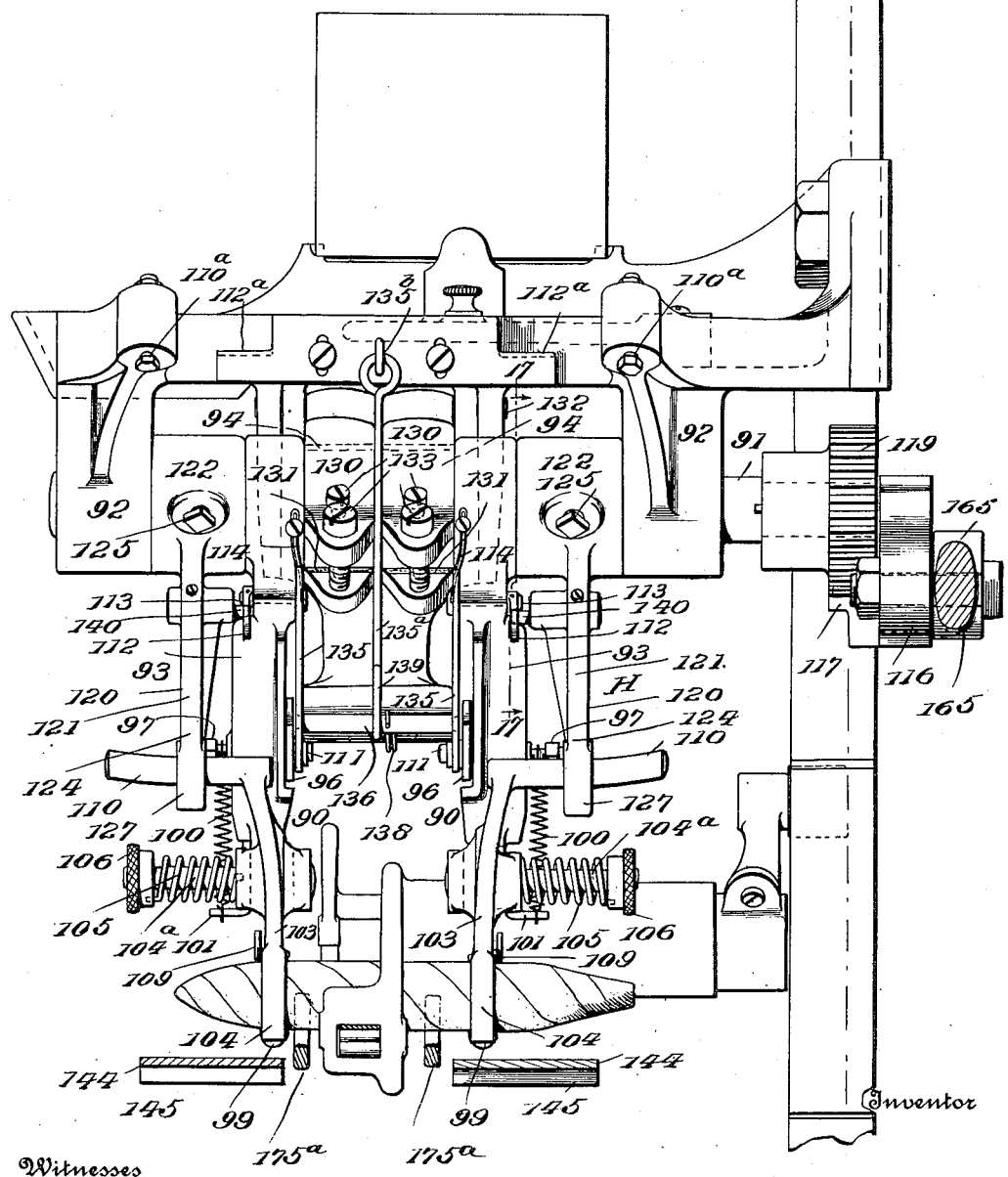

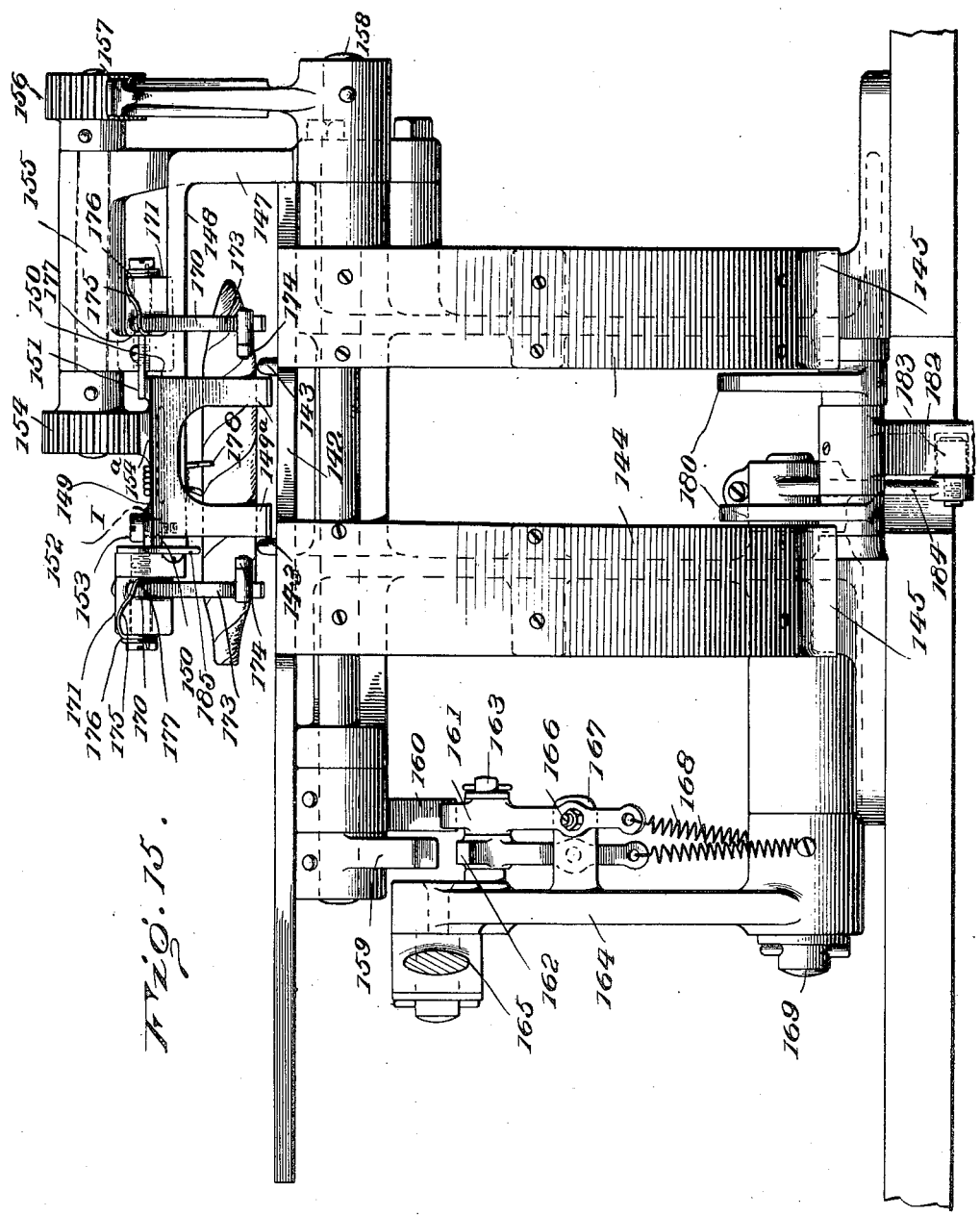

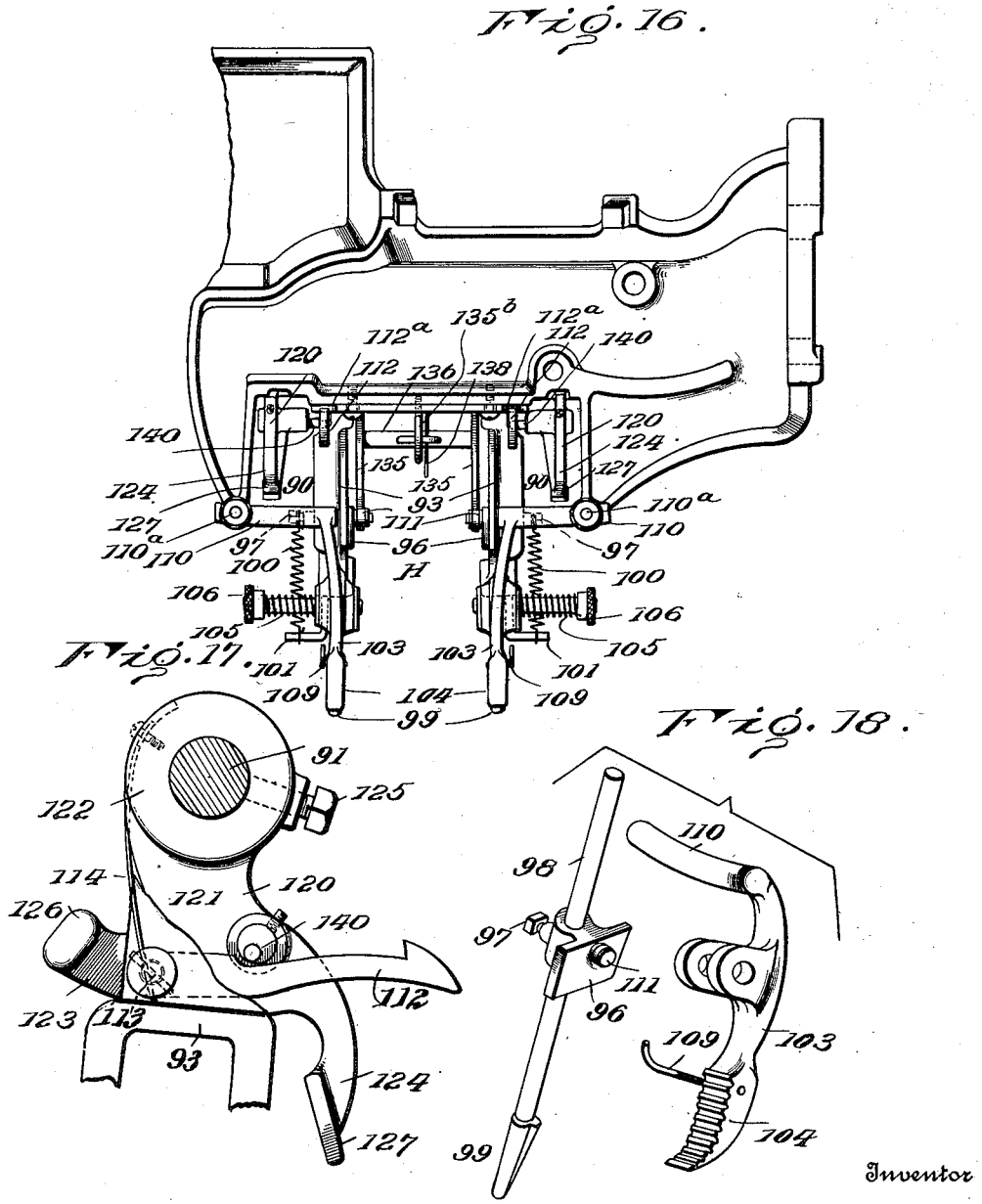

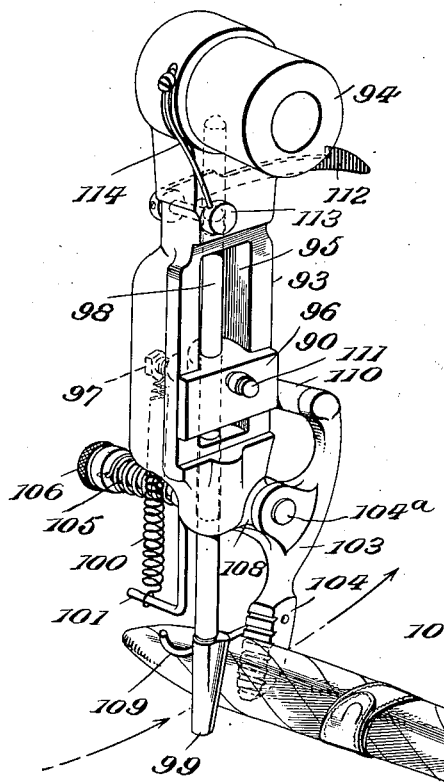
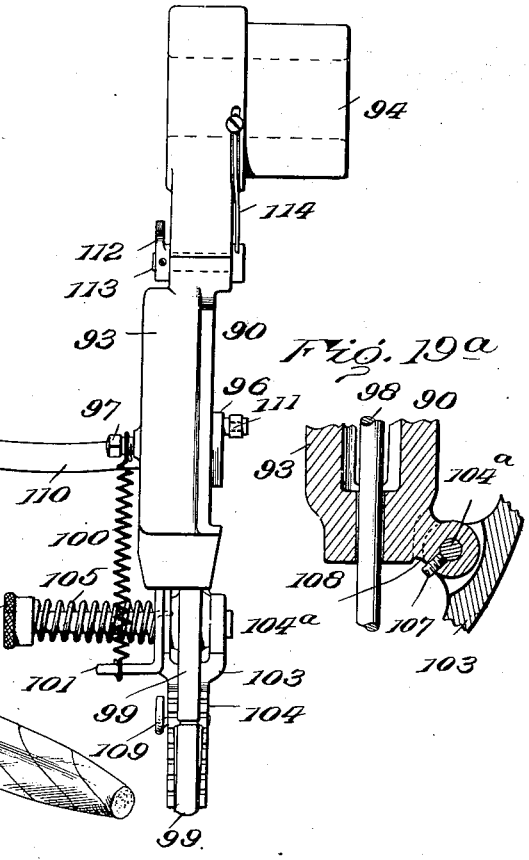
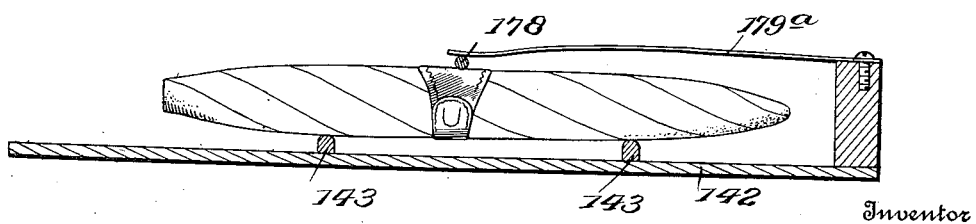

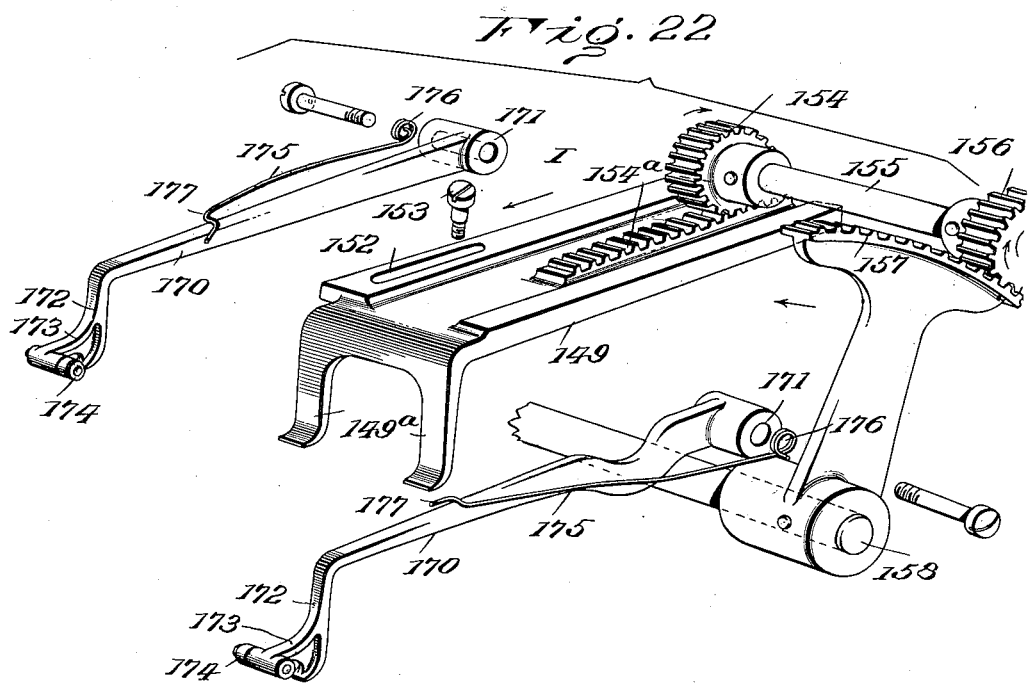
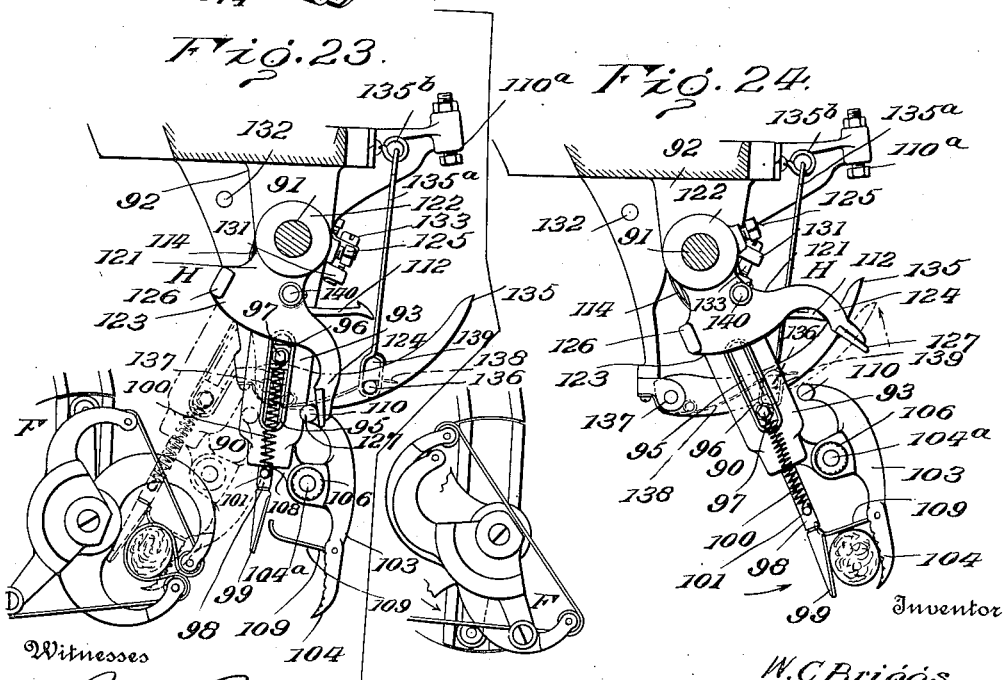

W. C. BRIGGS.
MACHINE FOR APPLYING BANDS TO CIGARS.
APPLICATION FILED NOV. 26, 1913.
1,138,275.
Patented May 4, 1915.
20 SHEETS—SHEET 19.
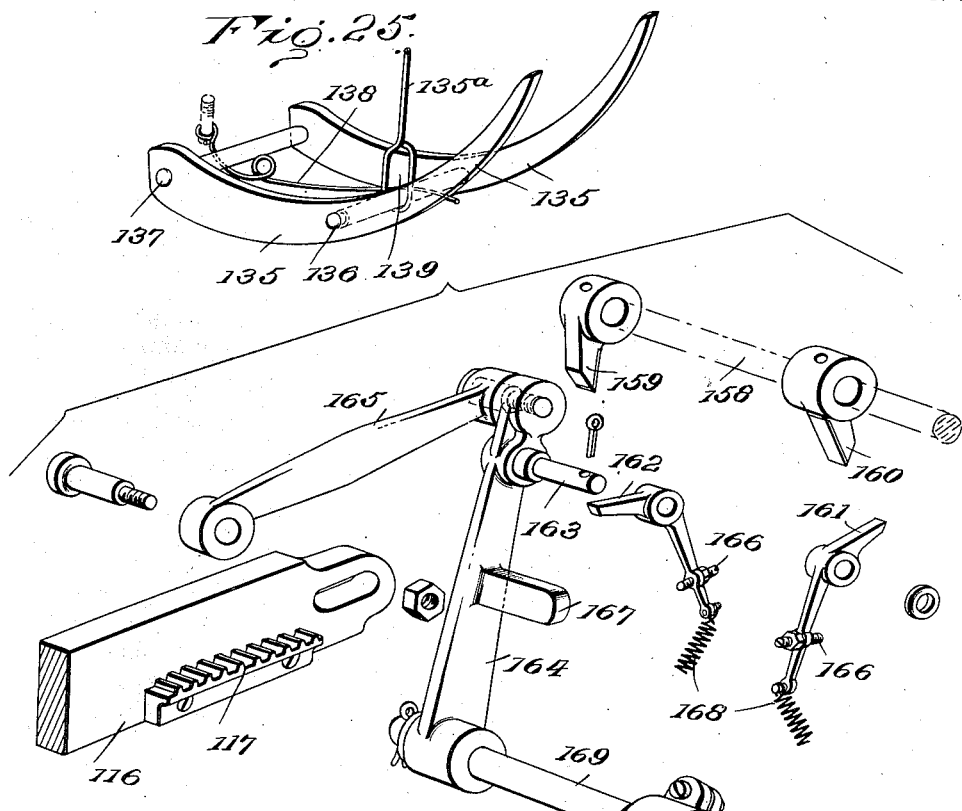
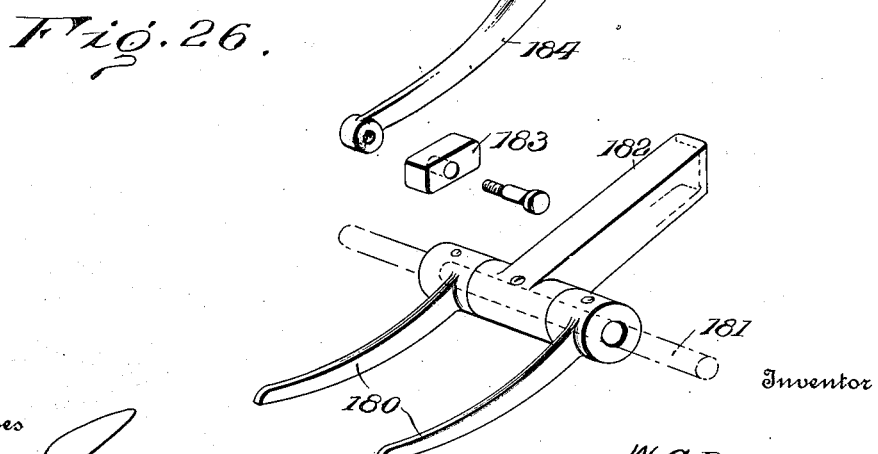

W. C. BRIGGS.
MACHINE FOR APPLYING BANDS TO CIGARS.
APPLICATION FILED NOV. 26, 1913.

1,138,275.

Patented May 4, 1915.
20 SHEETS—SHEET 20.

Fig. 27.

Witnesses

Inventor
W. C. Briggs.
by, Baldwin Wight
his Attorneys

UNITED STATES PATENT OFFICE.

WILLIAM CYRUS BRIGGS, OF LYNCHBURG, VIRGINIA, ASSIGNOR TO CAROLINA BANDING MACHINE COMPANY, OF WINSTON-SALEM, NORTH CAROLINA, A CORPORATION OF NORTH CAROLINA.

MACHINE FOR APPLYING BANDS TO CIGARS.

1,138,275.

Specification of Letters Patent. Patented May 4, 1915.

Application filed November 26, 1913. Serial No. 803,332.

*To all whom it may concern:*

Be it known that I, WILLIAM CYRUS BRIGGS, a citizen of the United States, residing in Lynchburg, in the county of Campbell and State of Virginia, have invented certain new and useful Improvements in Machines for Applying Bands to Cigars, of which the following is a specification.

This invention relates to cigar-banding machines of the kind shown in my application for Patent No. 648,839, filed September 12, 1911, and my present invention consists in certain improvements on said machine although it involves some features which are of more general application. The machine of said application was especially designed to apply bands to cigars after they have been packed and pressed in a box in such manner that the bands may be regularly and evenly applied and the cigars after being banded may be properly returned to the box and so arranged therein as to uniformly aline the bands with the medallions or prominent parts thereof uppermost. The machine of said application comprises, generally stated, mechanism for receiving a plurality of rows of cigars from a box and placing these rows successively in line with a platform over which they are moved;
mechanism which feeds the rows of cigars to devices which carry the cigars one at a time to band-applying devices, to which bands are previously supplied and which wrap the bands around the cigars and carry them to a shelf or platform onto which the cigars are discharged. The bands have paste-carrying ends and these are moistened after they are delivered to the band-applying devices and before the latter are operated to apply the bands. The mechanism in said machine is so organized and operated that after the cigars are received by the fenders they are automatically carried through the machine and automatically have bands applied thereto without any manipulation of either the cigars or the bands by the operator or attendant, and the banded cigars are automatically discharged onto a receiving platform or shelf from which they are transferred by an attendant to the box from which they were taken (or other similar box) in such manner that the bands will be in perfect alinement and the medallions or prominent parts of the bands will all appear on the upper or exposed sides of the cigars, the latter properly fitting together in the same way and being arranged in the same way that they were before they were taken from the box. Said machine operates efficiently at high speed to apply bands to cigars and to deliver them in the manner before stated so long as the rows of cigars, taken from a box, contain the same or the usual number of cigars, and the cigars are taken one by one from the rows and delivered to the band-applying devices without interruption and without injury to the cigars, but it sometimes happens that the number of cigars in a row, taken from a box, exceeds the regular number or is less than usual. This is due to haste in packing or to the difference in size of some of the cigars in a row. This condition of the rows of cigars was immaterial while the cigars were being advanced by the feeders, but as soon as the rearmost feeder, *i. e.*, the one nearest the band-applying devices, was removed, if the row contained more than the usual number of cigars the end cigar of the row would be so far advanced toward the band-applying devices that it would be in the path of the cigar-carrier when the latter was rising from the band-applying devices, and said carrier would tear the cigar wrapper, or if the row of cigars did not contain the usual number the end cigar in the row would not be sufficiently projected from the machine, so that when moved toward the band-applying devices by the carrier the front face of the cigar would be torn by engaging the frame of the machine or platform over which the cigars were moved by the feeders. It will be understood that this difficulty is not encountered where the cigars in a box are of uniform size, as they should be, or where each row of cigars in a box contains the proper number of cigars, but such difficulties were encountered when the machine was used generally for all grades of cigars.

One part of my present invention consists in providing means for automatically stopping the machine when the number of cigars in a row exceeds or is less than the regular number and where there is danger of the cigar being injured for this reason. This I do by causing the end cigar in the row to at times actuate certain mechanism which, when the number of cigars in a row is irregular, causes the driving belt of the machine to be shifted or otherwise causes the machine to stop before the carrying mechanism operates to convey a cigar to the band-applying devices when moving in one direction or before the carrier engages a cigar when moving in the opposite direction. The mechanism is so constructed that when the attendant is thus advised, by the stopping of the mechanism, she can reset or reorganize the mechanism before again starting the machine.

It will be understood that before starting the machine the attendant adjusts the feeders to accommodate rows containing a certain number and size of cigars, and as the feeders operate, the cigars being pressed by the feeders toward the carriers are put under some compression and when the feeder at the end of the row is withdrawn the end cigar of the row is forced into position to be engaged by the carriers.

It is necessary not only that the feeders should be properly set for the kind of cigars being operated upon and for the number of cigars in a row, but it is essential that the stop mechanism should be likewise properly adjusted. If these adjustments are not properly made, as soon as the machine is started it will be automatically stopped before a cigar can be injured.

In the machine of my former application, the cigars after being banded were delivered from the band-applying devices onto a platform or shelf, and it was necessary for the attendant to manipulate each cigar and place it properly in relation to the other cigars of a row with the medallion or prominent portion of the band uppermost. Often the cigars would accumulate in a pile and the relationship of the cigars would be destroyed. This occurred where the attendant did not give proper attention to the machine or did not remove the cigars from the platform with the necessary expedition.

One part of my present invention consists in providing mechanism for transferring the banded cigars from the band-applying devices to mechanism which delivers the cigars in proper relation to be taken by the attendant and placed in the box in such manner that each row will have the same number of cigars as it had before the cigars were banded and with all the medallions or prominent parts of the bands in proper alinement facing upward. This mechanism comprises transferring devices which receive the banded cigars one at a time from the band-applying devices and delivering mechanism which receives the cigars individually from the transferring mechanism and moves them over a shelf or platform where they are held in convenient reach of the attendant, who can take up a whole row of cigars and place it in the box without disturbing the relation of the rows or the relation of the individual cigars in each row.

The machine of my present invention involves many novel organizations of instrumentality and numerous details of construction which are believed to be new and which will be hereinafter described and claimed.

In the accompanying drawings:—Figure 1 is a perspective view of my improved cigar-banding machine, a portion only at the front being broken away. Many parts of the machine shown in Fig. 1 are the same in construction and operation as those shown in my before-mentioned application, but my improvements are also illustrated and certain changes in the prior machine are also indicated in this figure of the drawings. Fig. 2 shows a side elevation of the machine, with the front portion thereof omitted. Fig. 3 is a top plan view of the rear portion of the machine. Fig. 3ª is a similar view of the front portion of the machine. Fig. 4 shows a transverse section on the line 4—4 of Fig. 5. Fig. 5 shows an enlarged detail longitudinal section of a part of the machine, illustrating the relation of the cigar-feeding, carrying, banding, transfer and delivery mechanism. Fig. 6 is a diagram, illustrating particularly the construction and operation of the stop mechanism and its relation to other parts of the machine. This figure of the drawings shows the parts in the position which they occupy when the rows of cigars being fed contain the usual number and where the cigar-carriers are in the act of clamping a cigar to deliver it to the band-applying devices. Fig. 6ª shows certain details of the stop mechanism. Fig. 7 is a view similar to Fig. 6 and showing the same parts, but illustrating another step in the operation where the cigar is carried by the carriers to the appropriate band-applying devices. Fig. 8 is a similar view, showing the condition of the parts of the mechanism when the row of cigars being advanced by the feeders contains a greater number than usual, and this figure of the drawings shows the stop mechanism in position to be actuated to stop the machine. Fig. 8ª is a detail view of a part of the abutment mechanism. Fig. 9 is a view similar to Fig. 8, but showing how the mechanism is operated when a row of cigars contains a less number than usual. Fig. 10 is a top plan view of certain details of the stop mechanism, the parts being in the position shown in Fig. 6. Fig. 11 is a view similar to Fig. 10, but showing the stop mechanism actuated to stop the machine. Fig. 12 is a view on an enlarged scale and in longitudinal vertical section, showing certain details of the transfer and delivery mechanism, the transfer mechanism being shown in the position which it occupies when presenting a cigar to the delivery mechanism. Fig. 13 is a view, partly in side elevation and partly in section, of the transfer and delivery mechanism, the parts being in the position shown in Fig. 12. Fig. 14 shows a transverse section of the machine on the line 14—14 of Fig. 2 looking in the direction of the arrow. Fig. 15 is a similar view on the line 15—15 of Fig. 2, also looking in the direction of the arrow. Fig. 16 is a top plan view, showing certain details of the transfer mechanism, the parts being in the position shown in Fig. 12. Fig. 17 is a detail view in section, on the line 17—17 of Fig. 14, of part of the transfer mechanism. Fig. 18 shows, in perspective, certain details of the transfer mechanism. Fig. 19 is a perspective view of a part of the transfer mechanism, showing how a cigar is grasped by such mechanism. Fig. 19a shows a further detail of such mechanism. Fig. 20 is an end view of the mechanism shown in Fig. 19. Fig. 21 is a detail view in transverse section, of the shelf or platform to which the cigars are delivered by the transfer mechanism. Fig. 22 is a perspective view, showing parts of the delivery mechanism. Fig. 23 is a diagram, showing parts of the transfer mechanism and a banding device, and illustrating the position of the parts just before a cigar is engaged by the transfer mechanism, dotted lines indicating the position of the parts after the cigar has been thus engaged. Fig. 24 is a similar view, showing the banding device as having been opened and having delivered its cigar, and the transfer mechanism as having grasped a cigar and started on its way to the delivery mechanism. Fig. 25 is a perspective view, showing certain cams in the transfer mechanism for operating certain parts thereof. Fig. 26 shows in perspective several parts of the transfer and delivery mechanism. Fig. 27 is a diagram, showing in perspective, and with the position of the parts somewhat distorted, the power shaft and the connections between said shaft and different parts of the machine.

The machine embodies means A for receiving cigars from a box for delivery to a platform; means B for feeding rows of cigars toward the cigar-carrier; means C for carrying cigars individually to the band-applying devices; means D for feeding bands to the cigars (all indicated in Fig. 1); means E for moistening the paste-carrying ends of the cigars (Fig. 5); means F for applying the bands to the cigars; means G for automatically stopping the machine when a row of cigars, on its way to the band-applying mechanism, contains more or less than the required number; means H for transferring the banded cigars from the band-applying devices to the delivering mechanism; and means I for delivering the banded cigars onto a platform within convenient reach of the attendant.

The mechanism in many respects is the same as that shown in the machine of my application before-mentioned, the principal differences being the addition of the stop mechanism G, the transfer mechanism H and the delivery mechanism I.

The mechanism employed for operating the screw which actuates the feeders has been slightly changed, and there are some few changes in the abutment mechanism, which will be hereinafter specified.

For a full understanding of my invention, however, it has been necessary to show some parts of the prior machine, but the details of construction of most of the mechanism shown in said prior application have been omitted. Reference is made to said application for an illustration and description of the details of construction of said prior machine.

All of the cigars in a box are first delivered to the receiver or holder A from which they are moved in rows by hand over the table to the feeders B which move them to the carrier C, which conveys them past the stop mechanism G to the band-applying devices F, to which bands are fed by a band-feeder D, which bands are moistened at E and the banded cigars are ejected and conveyed by the transferrer H to the delivering mechanism I.

As before stated the cigars are first carefully packed in boxes and then pressed, and it is important that they should be so handled by the operator and by the machine that they may be returned to the boxes in precisely the same way. I so arrange the receiver or holder A that it may take all the cigars from a box and permit the several rows to be fed over the tables to the feeders successively without disarrangement. I have made no changes in the construction and operation of the mechanism A, and will therefore pass to a description of other parts of the machine. The feeders are also substantially the same in construction and operation as those of the prior machine. The function of the cigar-feeding mechanism, as in the prior machine, is to take the rows of cigars as they come from the holder A and automatically feed them regularly and evenly after receiving them to the carrier mechanism C which conveys them one by one to the band-applying mechanism F. As in the prior machine the feeders 1 are operated by a screw-shaft 2. This shaft is operated by novel mechanism, shown particularly in Figs. 1, 2, 3, 3a and 27 of the drawings. On the front end of the screw-shaft there is a pinion 3, meshing with a pinion 4, fast on a shaft 5 geared as shown with a shaft 6, mounted under the table and carrying a star wheel 7 having a plurality of recesses 8 on its periphery. Coöperating with the recesses in the star wheel is a pin 9 projecting from a crank 10, fast on a constantly rotating shaft 11, on one end of which is a beveled pinion 12, meshing with a similar pinion 13, fast on a shaft 14, mounted under the table and extending beyond the rear end thereof. On the rear end of the shaft 14, as shown in Fig. 27, for example, is a pinion 15, meshing with a pinion 16 on a vertical shaft 17, provided at its lower end with a pinion 18, meshing with a pinion 19 on a horizontal shaft 20, provided at its rear end with a pinion 21, meshing with a pinion 22 on the power shaft P. S. on which is mounted fast and loose pulleys 23, 24. The power shaft being constantly rotated imparts a constant rotation to the crank arm 10 and this imparts an intermittent movement to the star wheel and consequently an intermittent movement to the screw-shaft. In other respects the cigar-feed mechanism is the same as that of the prior machine.

The mechanism for returning the cigar-feeders is also the same and part of this is indicated in the drawings. In Fig 27, 25 indicates the chain for returning the feeders to their normal position. This chain is operated by a sprocket wheel 26 on the shaft 11. The chain passes over sprocket wheels 27, 28, 29, 30 and 31 as before, and the sprocket wheel 29, as before, is connected with a shaft 31ᵃ which operates the moistening devices.

The clamps 32 for holding the second cigar in the row, while the first cigar is being carried to the band-applying devices, are constructed and operated as before, and the upper and lower carriers 33 and 33ᵃ are constructed and operated as in the prior machine.

The abutment mechanism is similar to that in the prior machine, with some few changes. This abutment mechanism, as heretofore, comprises a shaft 34, which is operated by the mechanism 35, indicated in Fig. 27, such mechanism being geared as indicated at 35ᵃ in Fig. 27, to a shaft 36 hereinafter referred to, and which is geared, as hereinafter explained, to the power shaft. A hub or sleeve 37 is fixed to the shaft 34 and has forwardly projecting brackets 38, in the lower forward end of which are mounted two freely revolving relatively small wheels 39. Above the wheels 39 and mounted in the brackets 38 is a shaft 40, on which freely revolve the wheels 41 disposed outside the plane of the wheels 39, and these wheels 41 are of considerably larger diameter than the wheels 39. The abutments 42 are adjustably secured to the brackets 38 and perform the same function as they did in the prior machine. It will be observed that certain springs, which were used in the abutment mechanism in the old machine, have been omitted, and one of the abutments 42 is formed with a recess or depression 42ᵃ (Fig. 8ᵃ) to receive a pin 46 on the stop mechanism in the manner hereinafter explained.

Interposed between the abutment mechanism and the rear end of the guides, over which the cigars are fed by the feeders, is a roller 43, mounted in the bifurcated end of a depending lever 44, fixed on a shaft 45, mounted in bearings extending from the frame of the machine, as indicated for instance in Fig. 10, and also in Figs. 1 and 4. The pin 46 projecting laterally from the lever 44 engages at times in the recess 42ᵃ in the abutment 42. This occurs when a cigar is forced from the table and engages the roller 43. Supported on the lever 44 just above the roller 43 is a stop 47 having a forwardly projecting arm 48, the lower face of which is upwardly inclined. The stop is adjustably secured, as indicated at 49, to the lever 44 whereby the vertical position of the arm 48 may be regulated. The purpose of the stop is to prevent the end cigar of the row from jumping up and becoming displaced during an interval in the operation of the machine when the cigar is not held by other devices. The stop is so regulated that when the roller 43 is forced rearwardly by the advance of the cigars, it will bear gently on the upper surface of the cigar beneath it and prevent it from moving out of alinement with the remaining cigars in the row. The shaft 45 carries an arm 50 to which is attached one end of a spring 51, the opposite end of which is secured to the frame, as shown. The spring tends to force the roller 43 toward the end cigar in the row. The downward movement of the arm 50 is limited by a pin 52 on the frame of the machine and thus limits the forward movement of the roller 43.

When the number of cigars in the row is normal and the compression of the cigars in the row is also normal, the end cigar of the row will bear gently against the roller 43, or there may be a very slight space between the end cigar and the roller. The parts of the mechanism are, however, so arranged and timed that the compression and exact length of the row may vary within certain limits but as soon as these limits are exceeded or diminished, the mechanism will be actuated to automatically stop the machine. During the interval when the end cigar in the row is not supported, either by the carrier or by the table or guide over which the cigars are fed, and is not supported by the clamps 32 the whole row of cigars is moved by the feeders, and the end cigar is moved against the roller 43. At this time the tension of the spring 51 is sufficient to cause the unsupported end cigar in the row to be frictionally held against the next cigar in the row until the clamps 32 operate to engage the second cigar in the row, and the lower member 33ª of the carrier rises to form a support for the end cigar in rear of the clamps. Extending from the hub of the arm 50 is a lever 53, to the lower end of which is loosely pivoted a bar 54, preferably made of resilient material and extending horizontally and rearwardly from the lever 53. This bar is formed with a slot 55, and in one edge of the bar there is a long shallow recess 56, one end wall of which is beveled to form a lip 57. The bar 54 carries a plate 58, formed with slots 59, and with a tongue 60. The plate 58 is attached to the bar 54 by screws 61, and by means of these screws the position of the tongue 60 in the recess 56 may be regulated. The tongue 60 is beveled and is bent downwardly and projected as clearly shown in Fig. 6ª, its lower rear portion being in alinement with the lip 57 at the opposite end of the recess. This mechanism serves to operate a bell crank lever 62, pivoted to the frame of the machine at 63. One arm of the lever 62 carries a screw 64 which passes through the slot 55 in the bar 54. Between the head of the screw 64 and the bar 54 is interposed a light spring 65 which normally holds the bar 54 down upon the bell crank lever 62 but which will permit the bar 54 to move upwardly under certain conditions which will be described later on. The other arm 62ª of the bell crank lever 62 is bifurcated and is formed with guides 66 which engage grooves formed in a block 67 projecting from a collar 68 adjustably secured on a sliding rod 69 which operates in suitable bearings in the frame, and at its outer end is provided with belt guides 70 which receive the belt 71, adapted to engage either the fast or loose pulleys 23 and 24. The free end of the arm 62ᵇ of the bell crank lever is enlarged and extended vertically, as shown in Fig. 7, to form a head 72, which is provided with a vertical opening 73 and a recess 74 at its upper end. The opening 73 receives a dog 75, formed near its upper end with a traverse groove 76, and carrying a pin 77, which latter limits the downward movement of the dog in the recess 74. The groove 76 is so located in the dog that when the latter is in its elevated position and the bar 54 is reciprocated the lip 57 and the tongue 60 will enter the groove and the dog will be so held in its elevated position that the machine may continue to operate, the dog being held in its elevated position when not engaged by the lip or tongue by a disk 78, mounted on a horizontal shaft 36. The disk is formed on its periphery with two recesses 80, 81, disposed on diametrically opposite sides of the shaft 36. The shaft 36 carries a spur wheel 82, which meshes with a pinion 82ª on the power shaft. At times the dog 75 enters one of the recesses 80 or 81 and when it does so enter a recess the dog is actuated in such manner as to operate the bell crank lever 62 and stop the machine. As shown the wall at one end of each recess is made abrupt, as indicated at 83, and is adapted to engage the lower end of the dog when the dog is not engaged by the lip 57 or the tongue 60 and when its lower end enters the recess. It will be understood that the dog is intermittently released from the lip 57 and the tongue 60, and when so released in the normal operation of the machine it is not over one of the recesses 80 or 81 but rides on the periphery of the disk between said recesses. The arrangement is, however, such that when the dog is not supported by the bar 54 and is supported by the disk the groove 76 will remain in the path of movement of lip and tongue so that either one or the other will enter the groove and support the dog at the time the recesses 80 and 81 pass under it. (See Figs. 6 and 7.)

This is the manner in which the parts operate normally. When the usual number of cigars is in a row the roller 43, as indicated in Figs. 6 and 7, is swung back and forth without in any way interfering with the normal operation of the machine. Figs. 6 and 7 illustrate the condition of the mechanism when the number of cigars in the row is normal, and it will be observed by reference to Fig. 7 that the end cigar in the row is properly engaged by the clamping mechanism, its rear or exposed face being out of the path of movement of the carrying devices when the latter rise. When the carrying devices are returned to their upper or normal position they will pass freely by the clamped cigar in the row without tearing the wrapper, and when a cigar is carried to the band-applying devices, as indicated in Fig. 7, the roller 43 is moved into contact with the end cigar in the row by means of the spring 51. In so doing the lever 44 is rocked and pulls the bar 54 in the direction indicated by the arrow, in Fig 7, thus bringing the lip 57 into the groove 76 of the dog 75 and the dog is held suspended, not being allowed to enter the recess 81. While the carrying mechanism is delivering a cigar to the band-appling devices, as indicated in Fig. 7, the recess 81 of the disk 78 approaches the lower end of the dog 75 so that as soon as the clamping devices 32 engage a cigar and the previous cigar (now engaged by the banding devices) is moving toward the banding devices the roller 43 will move against a cigar, the recess 81 being almost under the dog 75, but as the cigar is in proper position, the row being normal and the compression being correct, the roller 43 will travel far enough to cause the arm 50 to engage the pin 52 at which time the lip 57 is engaged in the groove 76 of the dog 75. This engagement of the lip in the groove takes place just before the edge 81ˣ of the recess 81 comes under the dog 75, which latter is thus held suspended and is prevented from falling into the recess while the latter is passing under it.

When a cigar is forced away from its guides on the table to be engaged by the carrying devices 33, 33ᵃ, as shown in Fig. 6, the roller 43 is forced rearwardly by the movement of the row of cigars. During this movement of the roller 43, the bar 54 is moved in the direction of the arrow (Fig. 6) and the tongue 60 of the plate 58 engages the groove 76 of the dog and holds the latter elevated while the recess 80 is passing. The recess 80 is so proportioned and the movement of the disk 78 is so timed that the movement of the bar 54 takes place prior to the time the edge 80ˣ of the recess comes under the dog, so that if the rows of cigars are of the proper length the machine will not be stopped.

When the parts are in the position shown in Fig. 6 the pin 46 on the lever 44 seats itself in the recess 42ᵃ of the abutment so that the front faces of the abutment and the periphery of the roller 43 are in horizontal alinement. This is of some importance as it furnishes a practically continuous surface for the rear face of the cigar to bear upon and greatly facilitate the carrying of the cigar down to the band on the tape of the band-applying devices below it.

In the case of a cigar of irregular shape, the compression caused by the feeders will press the cigar against the surface formed by the abutments and the roller and the cigar will be carried accurately to its proper place in the band-applying devices.

It will be understood therefore, that under normal conditions while the roller 43 will be swung back and forth the dog 75 will not be operated to stop the machine inasmuch as when the roller 43 swings within certain limits it so controls the position of the lip 57 and the tongue 60 of the reciprocating bar 54 that said lip and tongue support the dog above the recesses 80 and 81 when they are passing, and therefore the shoulders of said recesses cannot engage the dog to operate the bell crank lever for shifting the power belt.

It may be said in passing that the purpose of providing two recesses 80 and 81 in the disk 78 is because the timing of the shaft 36 is such as to operate other parts of the mechanism at a certain speed, the shaft making one complete revolution during the time a cigar is forced from the table on which it is advanced by the feeders and is removed by the carrier to the band-applying devices. For this reason the roller 43 operates on either one of the two end cigars of a row during one complete revolution of the shaft 36.

As before stated the number of cigars in a row may be greater or less than the required number. When a row contains a greater number than usual, the compression between the feeders is greater than that for which the machine is adjusted and when the rearmost feeder is withdrawn to be returned to its normal position the row will expand and force the end cigar, indicated in Fig. 8, beyond the end of the table. Hence, were it not for my improved automatic stop mechanism the carriers 33, in returning to the upper and normal position would encounter that part of the cigar projecting beyond the table and tear the wrapper. This is clear from an inspection of Fig. 8. By my improvements this injury to a cigar is not possible, for as soon as the roller 43 is moved forward by the spring 51 it comes in contact with the rear face of the cigar which has been advanced some distance beyond the normal stopping point of the roller, and for this reason the lip 57 will not be moved far enough to engage the groove 76 of the dog 75 and the recess 81 will come under the dog and the latter will drop until the pin 77 strikes against the bottom of the recess 74. As the disk 78 continues to rotate the abrupt end wall 83 of the recess 81 will come in contact with the lower end of the dog and rock the bell crank lever 62 and thus shift the belt from the fast to the loose pulley. The path of movement of the dog, viewed from the side of the machine, is in a horizontal plane, as indicated by the dotted line $w$ in Fig. 8, and as the periphery of the disk travels in a circular path the bottom of the dog will soon be out of the path of the shoulder 83 and the periphery of the disk will soon be again beneath the bottom of the dog before the disk can come to a full stop, as indicated in dotted lines in Figs. 8 and 9. This operation is due to the fact that after the bell crank lever has been shifted the parts operate for a very limited time by their momentum. It is this momentum which causes the disk to rotate far enough to bring the peripheral portions of the disk between the recesses under the dog so that the latter can be reset after the feeders have been readjusted to accommodate the cigars of the row being operated upon. Thus it is clear that when there are too many cigars in a row the machine will be automatically stopped before any cigar can be disfigured or injured. The attendant, it will be understood, readjusts the feeders to properly space them to accommodate the rows of cigars on the table, and by rocking the bell crank lever 62 in the proper direction the belt may be shifted to the fast pulley. In so rocking said lever the dog 75 is caused to ride upon, and is temporarily supported on the periphery of the disk 78, and the groove 76 is again brought into the path of the lip 57 and the tongue 60, and if the adjustment of the feeder is correct the machine will operate properly without being stopped.

It should be remembered that before the machine is started the rods 1ª on the feeders are properly set in such manner that when the feeders are lowered to engage the cigars the rods serve to space them, the rear end of the rod on one feeder being made to engage the front of a following feeder, and thus the space between the feeders is made to accommodate a certain number of cigars, but if a greater or less number of cigars is placed between two feeders the compression on the cigars between the feeders will be correspondingly increased or reduced. The machine is also in like manner stopped if the number of cigars in a row is less than the required number. In such case the compression will not be sufficient when the end feeder is removed to force the end cigar far enough rearwardly to be properly engaged by the carrying devices without dragging the cigar on the edge of the table and destroying the wrapper. Fig. 9 illustrates such a condition and by reference thereto it will be observed that if the end cigar were carried down to the banding devices it would engage the end of the table, and the cigar would be torn. The automatic stopping mechanism is just as efficient to remedy this defect as when too many cigars are contained in a row. Under these circumstances, when the row of cigars is forced rearwardly toward the end of the table and the requisite number is not in the row, as shown in Fig. 9, the roller 43 and its supporting lever are rocked rearwardly, causing the bar 54 to be moved in the direction of the arrow, Fig. 9; but because of the improper number of cigars in the row this movement is not sufficient to advance the tongue 60 far enough to engage the groove in the dog 75; hence, when the recess 80 in the disk 78 comes under the dog, the latter drops and its lower end will then be in the path of movement of the shoulder 83. Precisely the same operation now takes place as before, i. e., the bell crank lever 62 is rocked and the machine is stopped before the carrying mechanism can grasp the end cigar on the table.

It frequently happens that the machine is automatically stopped when the dog 75 lies directly under the lip 57, as indicated in dotted lines in Figs. 8 and 9. It is under these conditions that the spring 65 and the resiliency of the bar 54 come into play. Assuming that the dog has been thrown to the dotted line position shown in Fig. 9, and the feeders on the table have been readjusted and the row of cigars moved forward preparatory to again starting the machine, obviously the lip 57 would be drawn forwardly until it would be directly over the point where the dog would come when the bell crank lever is again moved to start the machine. Hence the upper end of the dog would impinge under the bar 54 and bend it upwards slightly against the force of the spring, as shown by dotted lines in Fig. 7. Upon the next rearward movement of the bar 54 the lip 57 will ride over the dog and assume the right plane to subsequently engage the groove of the dog. When it is desired to adjust the parts to let the dog drop at the proper time in either of the recesses 80 or 81 the screws 61 are released and the plate 59 is moved back or forth and held in the required position. The plate 59 and the abutments 42 should be adjusted to accommodate cigars of different diameter so that if the machine is set to band one grade of cigar, say of large size, and it is desired to band another style of cigar which may be smaller in diameter, the distance between the roller 43 and the end cigar of the row on the table can be decreased. For this reason the abutments 42 should be readjusted toward the end of the table so as to about equal the small diameter of the cigar and correspondingly the plate 59 should be adjusted toward the dog 75, because in handling the smaller cigars the distance between the lip 57 and the tongue 60 must be less than when handling cigars of larger diameter.

To emphasize the relative movement of the parts by the action of the cigar on the table, I have indicated by dotted lines in Fig. 9 the position of the end cigar had the row been of the proper length. Had the roller 43 been moved outward to the dotted line, the tongue 60 would have been engaged in the groove 76 of the dog before the recess 80 in the disk came under said dog. Therefore, unless the rows of cigars on the table are of the proper length and are under proper compression within a given range, the stop mechanism will be brought into play and the machine will be automatically stopped before any damage is done to the end cigar.

As heretofore stated, the machine is constructed to deliver cigars to a platform or shelf in the exact order they were in when they came from the box in order that the operator may conveniently gather up row after row of cigars and pack them in a box in the shortest possible time. This mechanism comprises transferring devices H which grasp the individual cigars and carry them away from the banding devices and delivery mechanism I which receives the cigars individually from the transferring mechanism and moves them over a shelf into convenient reach of the attendant.

Both the transfer and delivery mechanism are located beneath the platform or table over which the cigar-feeding devices B operate, the transfer mechanism being arranged to grasp the cigars one at a time on the front side of the annular series of band-applying devices and to lift them one at a time as they leave the band-applying devices and convey them to the plane of the delivery mechanism which takes the cigars thus lifted and adds them one by one to a row of cigars which is moved step by step over the guides on the delivery platform.

The transfer mechanism comprises two oscillating conveyers 90 loosely mounted on a horizontal shaft 91 supported in brackets 92 of the main frame. The two conveyers are of the same construction and each consists of a lever 93 formed with a hub 94 through which the shaft 91 extends. The lever is formed with an opening 95 in which slide a block 96 secured by a screw 97 to a rod 98 which slides in bearings formed in the lever at opposite ends of the opening 95. The rod carries at its outer end a head or jaw 99 which is adapted to engage the cigars in the manner hereinafter described. The rod 98, when free, is moved downward by a spring 100 secured at one end to a bent wire 101 extending from the lever and at its opposite end to the screw 97 on the block 96.

A lever 103 provided with a jaw 104 coöperating with the jaw 99 of the rod 98 is pivoted to a rod 104ª carried by the lever 93 and projecting sidewise therefrom as shown. On said rod is arranged a coiled spring 105, one end of which is attached to the lever 103 and the other to the cap 106 on said rod 104ª. The spring tends to move the jaw 104 toward the jaw 99 and the tension of the spring may be varied or regulated by means of a set screw 107 (Fig. 19ª) extending into the bracket 108 of the lever 93 and engaging the rod 104ª. The lever 103 carries at its lower end a bent wire 109 which is adapted to bridge the space between the two jaws 99 and 104 and prevent cigars from rising too far in said jaws and said lever 103 carries at its upper end an arm 110 which is engaged at times by mechanism hereinafter described for operating it. The block 96 before referred to is provided with a roller 111 mounted on a pin secured to the block 96 which is engaged at times by mechanism for drawing the jaw 99 inward.

At its upper end each lever 93 carries a latch 112 which is adapted to engage a ledge 112ª of the machine frame and hold the lever in an elevated position while the jaws are separated and when cigars are being passed from the transferring mechanism to the delivery mechanism. The latch is pivoted at 113 to the lever and is normally held in the position shown in Fig. 19 by a spring 114. It will be understood that there are two sets of mechanisms 90 of the kind shown in Fig. 19. They are arranged side by side but spaced apart and operate on opposite sides of the band-applying devices and near opposite ends of each cigar.

The shaft 91 is oscillated by mechanism, most clearly shown in Fig. 27 but parts of such mechanism are shown in other figures of the drawings. On the shaft 36, hereinbefore referred to, is a crank arm 115 to which is pivotally connected a link 115ª joined at 115ᵇ to a rod 116 suitably guided in the machine frame and carrying a rack 117 which engages a pinion 119 on the shaft 91. The rod 116 also serves to operate other mechanism hereinafter referred to.

The conveyers 90 are not keyed to the shaft 91, but are loosely mounted thereon and are moved by two levers 120 which are keyed to said shaft 91. Each of said levers, as shown in Fig. 17, comprises a body portion 121, a hub portion 122, and arms 123, 124. The hub is secured to the shaft by a set screw 125 and the arms 123, 124 are formed with lugs or dogs 126, 127 which are adapted to engage the conveyer and raise and lower it, in the manner hereinafter described, and to also operate the jaw 104 to open it at the proper time. It will be seen from the drawings that there are two levers 120, one for each conveyer 90. The dogs 126, 127 alternately engage the conveyers and after the conveyers have been lifted by the levers the dogs 127 move away from them. In order to prevent the conveyers from at times dropping of their own weight I provide brake devices, shown most clearly in Fig. 12. The hub 94 of each conveyer is engaged by semi-circular shoes 130 having leather linings 131. The shoes are pivoted on a rod 132 fixed to the machine frame and they are provided with devices 133 by means of which they may be adjusted to vary the pressure on the hubs. In this way the conveyers are prevented from moving except when positively moved by the levers 120 and said levers are moved at the proper time by the oscillating shaft 91 which is operated in the manner before described. Each lever 120 carries a cam 140 adapted to engage a latch 112 carried by an adjacent lever 93 of the conveying mechanism. Fig. 17 shows the relation of these parts. When the conveyers are raised to the limit of their upstroke, the latches 112 engage parts 112ª of the machine frame and support the conveyers, and when the levers start to move on the down-stroke, the cams 140 engage the latches and free them, then the dogs 127 engage the arms 110, hold the jaws 104 open and move the conveyers downward to their lowermost position.

In order to properly operate the jaws 99 I provide two cams 135 consisting of two curved arms connected by a rod 136 and pivoted at 137 to the machine frame. The cams are normally pressed downward by a spring 138, connected with the main frame and with the connecting rod 136. These cams are also supported by a rod 135ª connected at 135ᵇ to the machine frame and having a loop 139 at its lower end through which the rod 136 extends. By this arrangement the cams, while permitted to move upward to a limited extent, are prevented from moving downward beyond a certain limit.

In the operation of this mechanism when a band-applying device is opened, as shown at 141 in Fig. 5, and as described in my application for patent before mentioned, the banded cigar is grasped by the jaws 99 and 104 and then the shaft 91 is turned and correspondingly moves the levers 120. In so doing the lugs 126 engage the levers 93 and raise them in the manner shown in Fig. 24. When the rollers 111 engage the cams 135 (Fig. 24) the cams are raised, as indicated by dotted lines, and do not change the relation of the jaws. After passing the cams the jaws rise to the position shown in Fig. 12 and the latches 112 engage the frame at 112ª and the levers cease moving upward at the same time stops 110ª on the main frame engage the arms 110 and open the jaws 104 so as to allow the delivery mechanism I to operate in the manner hereinafter described. While the cigar is being delivered the shaft 91 is turned in the opposite direction, at first without affecting the relation of the jaws, but soon thereafter the dogs 127 engage the arms 110 holding the jaws open and moving the conveyers downward. As soon as the conveyers reach the cams 135, the rolls 111 on the blocks 96 engage the upper surface of the cams and ride along the cams causing the jaws 99 to be moved inward so that the jaws may pass by a cigar held in the band-applying devices. After the rollers 96 have passed by the cams, the jaws 99 are shot outward by the springs 100 and assume a position in rear of the cigars just about to be discharged by the band-applying devices. Fig. 23 shows this operation and as soon as this is accomplished the levers 93 commence to move in the opposite direction, the dogs 127 being disengaged from the arms 110 and the jaws 104 being close to the cigar. As the levers 123 swing upward they carry with them the levers 93 while the jaws 99, 104 grasp the cigar and move it upwardly to the delivery mechanism in the manner before described.

The delivery mechanism receives cigars one by one from the transfer mechanism and moves them onto a shelf or platform 142 provided with parallel guide rails 143 over which the cigars pass.

Extending downwardly from the front end of the platform is a pair of guides 144, curved, as shown, from the axis of the shaft 91 as a center. These guides have bent ends 145 and they serve to support the cigars while being conveyed by the transfer mechanism if for any reason the jaws 99 and 104 fail to properly hold them. Sometimes a cigar is grasped by the jaws when it is a trifle lower in the band-applying devices than it should be and under these conditions the cigar will ride up on the bent ends 145 of the guides by which it is forced up between the jaws to proper position, the springs 105 yielding sufficiently for this purpose. Sometimes the jaws may not close tightly enough on a cigar and the latter will then ride on the guides and reach the delivery mechanism and assume a proper position to be shifted to this mechanism.

Above the platform 142 is a frame having a vertical portion 147 attached to the machine frame, as shown in Fig. 13, and a horizontal portion 148 which overhangs the platform, as shown in Figs. 12 and 15. Mounted in this frame is a reciprocating rake bar 149 operating in guides 150. Co-operating with one of the guides is a plate 151 and in the bar 149 is a slot 152 through which a screw 153 secured to the frame 148 passes. The screw 153 and plate 151 hold the bar 149 in the guides and the slot 152 limits the movement of the reciprocating bar which latter moves quickly and the slot is of such length as to limit said movement in both directions. The rear end of the bar 149 is bent downward to form two teeth 149ª which act as a rake to draw cigars one at a time from the jaws 99 and 104 onto the platform 141. The bar 149 is operated by a pinion 154 engaging a rack 154ª carried by the bar. Said pinion is mounted on a shaft 155 carrying at its outer end a pinion 156 engaging a toothed segment 157 attached to the shaft 158 mounted in bearings below the platform. This shaft carries at its inner end two arms 159, 160 placed side by side on the shaft but arranged in different radial planes. Said arms are engaged at times by pawls 161, 162 pivoted on a rod 163 projecting horizontally from a lever 164 secured to a horizontal shaft 169 and connected by a link 165 with the reciprocating rod 116 hereinbefore mentioned. The pawls 161, 162 are in the form of bell-crank levers, the upper horizontal arms projecting in opposite directions from the rod 163. The lower portion of each pawl carries an adjustable screw 166 which is adapted to abut against a lug 167 on the lever 164 and said screws are normally drawn into engagement with said lug by springs 168. When the rod 116 is moved in the direction of the arrow (Fig. 5) the upper free end of the pawl 161 will strike the arm 160 and rock the shaft 158, thereby imparting a rearward movement to the bar 149, thus putting the rake teeth in position to receive the cigar carried by the transfer mechanism as indicated in Fig. 12. The continued movement of the bar 116 in the direction of the arrow (Fig. 5) will rock the upper end of the pawl 161 away from the arm 160 (Fig. 12) and as the arm moves in a circular path it will move out of the path of the end of the pawl 161 and said pawl and arm will separate.
During this movement the upper free end of the pawl 162 drags on the bottom of the arm 159, the pawl at this time rocking on its pivot and increasing the tension of its spring 168. About the time that the bar 116 has moved to its fullest extent in the direction of the arrow (Fig. 5), the upper free end of the pawl 162 passes the arm 159 and by reason of the tension of the spring 168 said pawl will slip up behind the arm 159, as shown in Fig. 12. Upon the reverse movement of the rod 116 the pawl 162 will make contact with the arm 159 and rock the shaft 158 in the reverse direction, therefore the rake bar 149 will be retracted and a cigar will be drawn from the jaw 99 and transferred to the platform 142. The pawl 162 rides off from the arm 159 and the pawl 161 slips in behind the arm 160 in the manner similar to that before described.
In order to assist in the operation of moving cigars from the transfer to the delivery mechanism I provide two levers 170 hinged at their front ends 171 to the overhanging frame 148 and extending forwardly on opposite sides of the reciprocating bar 149. At their front ends the levers are formed with downwardly extending arms 172 parallel with the teeth 149ª and forming a gate to close at times the entrance to the platform 142. Each arm is adapted to assume a position in front of a cigar after it has been delivered to the platform and hold it against accidental displacement as shown in Fig. 2. Each lever 170 is also formed with an arm 173 carrying a roller 174 arranged in the path of the jaw 104. When said jaw rises it makes contact with the roller and raises the gate for the admission of a cigar to the delivery mechanism.
The levers 170 are normally held by gravity in position to close the entrance to the platform and they will ordinarily descend to this position at the proper time by their own weight, but inasmuch as they move quickly they will frequently rebound and to prevent this I provide a spring 175 for each lever which may be made of wire, as shown, connected at 176 to the hub of the lever and having its rear end bent at 177 to engage the lever as clearly shown in Fig. 22. A light resilient wire spring 178 is preferably employed in the delivery mechanism and mounted to gently bear on the row of cigars on the platform, as indicated for instance in Fig. 13. The rear end of the wire is bent at 179 in such manner as to engage the cigars one at a time as they are introduced. The arrangement is such that the spring prevents the cigars from rolling back at the time that the transfer is made from the transfer mechanism to the delivery mechanism. This is clearly indicated in Fig. 12. The front portion of the spring 178 may be held down by a spring finger 179ª, as indicated in Fig. 21.

It sometimes happens that a cigar will be tilted while in a band-applying device, and if some means were not provided for straightening the cigar it would be broken when moved against the guides 144. I therefore provide a pair of fingers 180, attached to a short shaft 181, to which is attached a grooved arm 182. The groove of this arm receives a block 183, attached to the lower front end of an arm 184, secured to the shaft
169. The fingers 180 are so arranged as to engage under and straighten a cigar while in a band-applying device at a time when the jaws 99, 104 are being operated to grasp said cigar. Normally the fingers 180 are out of the path of movement of the cigar, but just as the jaws are about to grasp a cigar the lever 164 is rocked and the arm 184 is lowered, thus tilting the fingers 180 upwardly against the cigar to straighten it horizontally. After this, the jaws 99, 104 firmly grasp the cigar and carry it up to the transfer mechanism.

I may also employ a vertically arranged plate 185 in the delivery mechanism. This plate is arranged parallel with the rake bar 149 and on one side thereof. It has a curved or inclined edge, as shown in Fig. 12, and its lower edge is disposed a short distance above the plane of the cigars, as indicated in Fig.
12. The vertical position of this edge may be adjusted in any suitable way, as indicated at 186. Fig. 15 shows the relation of this plate with the other parts of the mechanism, and it is used merely to assist in keeping the cigars in proper position.

The operation of the mechanism when transferring cigars from the band-applying devices to the delivery mechanism, and the operation of the delivery mechanism has been heretofore described, but the conjoint operation of such mechanisms will now be specified.

Fig. 2 shows the condition of the mechanism when a cigar is clamped by the jaws of the transferring mechanism and a cigar is just about to be released from the band-applying devices, and the rake bar 149 is just about ready to be projected forwardly to receive the cigar elevated by the transfer mechanism.

At this time the rack 117 is moved sufficiently to move the dogs 127 of the operating levers 120 away from the arms 110 of the levers 103 to allow the springs 105 to close the jaws 104 on the cigar. At this time the springs 100 have drawn the jaws 99 downward to their lowermost position behind the cigar. At this time also the crank 115 on the shaft 36 has just passed the dead center to operate the mechanism and the cigar, having been straightened by the fingers 180 in the manner before explained, and grasped by the jaws 99, 104, the banding devices are opened and the cigar is now free to be moved. As the rack 117 continues to move in the direction of the arrow, Fig. 2, the transfer mechanism will carry the cigar up to the delivery mechanism. At this time the dogs 126 engage the levers 93. The first movement of the bar 116 transmits motion to the shaft 155 and the rake is projected from the platform and made to assume the position shown in Fig. 12.

In the upward movement of the transfer mechanism the arms 110 strike the bolts 110ª and the jaws 104 are opened, in the manner indicated in Fig. 12. Just about this time the rake bar 149 is retracted and draws the cigar onto the platform 142. At the time the jaws open the latches 112 engage the machine frame at 112ª and temporarily hold the transfer mechanism stationary to give the rake ample time to move the cigar from the jaws 99 onto the platform. The levers 120 then commence to return to their lower position and just prior to the time the dogs 127 strike the arms 110 the cams 140 engage the latches 112 and release them from the frame. The dogs having forced the arms 110 against the levers 93 and the levers 120 being now moved downward the levers 93 are carried back to their lowermost position, as shown in Fig. 2 and in dotted lines in Fig. 23. During the return of the conveyers the rollers 111 engage the upper surfaces of the cams 135, and the sliding jaws are retracted, in the manner shown in Fig. 23. This retraction of the jaws is quite necessary for by the time they reach the banding devices 141 the cigar will be in the path of the jaws. The rear ends of the cams 135 are so disposed that as soon as the rollers 111 reach the end of the cams the springs 100 quickly draw the jaws 99 down behind the cigar, as shown by dotted lines in Fig. 23. When the jaws 104 move away from the delivery mechanism the levers 170 drop and the arms 172 close the mouth of the platform. This is for the purpose of holding the rows of cigars in position and for preventing them from being forced backward by an operator when gathering the rows of cigars to pack them into a box. Between the time when the rake is projected to receiving position and the time when the levers 93 are elevated the arms 172 of the levers 170 are in closed position.

The movement of the swinging levers 93 in both directions is controlled by the levers 120, and the brakes 130 act with sufficient friction to allow the levers 93 to move steadily and not to pass the extreme limits of movement. The brakes also serve to hold the jaws open while the levers 93 are passing downward and until they receive a cigar from the banding mechanism.

When the transfer mechanism is in the position shown in Fig. 12 the bar 116 is about to be reversed; hence the rake will drag the cigar onto the platform and the gate will subsequently be lowered and the whole row of cigars will move forward the distance of one cigar. At this time the latches 112 serve to hold the jaws 99 stationary and at this time also the levers 120 return, but the latches 112 hold the levers 93 against possible movement until the dogs 127 engage the arms 110. While the levers 93 are held by the latches the rake quickly draws a cigar from the jaws 99 over onto the platform.

In this way the banded cigars are taken one at a time from the band-applying devices and transferred to a platform on which they are properly arranged within convenient reach of the attendant who can lift row after row of cigars from the platform and properly place them in the boxes from which they were taken, or in similar receptacles.

I claim as my invention:—

1. In a machine for applying bands to cigars, the combination with band-applying devices, of means for delivering cigars one at a time thereto, and means operated by the cigars while being advanced toward the band-applying devices for, automatically arresting the operation of the machine.

2. In a machine for applying bands to cigars, the combination with band-applying devices, of means for feeding rows of cigars, means for carrying cigars one at a time from a row to the band-applying devices, and means operated by the cigars while being advanced for automatically stopping the machine when a row of cigars is of irregular length.

3. In a machine for applying bands to cigars, the combination with band-applying devices, of means for feeding rows of cigars, means for carrying cigars one at a time from a row to the band-applying devices, a lever operated by the end cigar of a row, and stop mechanism actuated by said lever for arresting the operation of the machine.

4. In a machine for applying bands to cigars, the combination with band-applying devices, of means for feeding rows of cigars, means for carrying the cigars one at a time to the band-applying devices, a lever connected with the driving mechanism of the machine, a lever operated by the cigars while being advanced, and connections between said levers for arresting the operation of the machine.

5. In a cigar-banding machine the combination with band-applying devices, of means for feeding rows of cigars, means for carrying the cigars one at a time to the band-applying devices, a lever disposed in the path of the end cigar of a row and adapted to be moved thereby, a reciprocating bar operatively connected with said lever, a lever for starting and stopping the machine, a dog carried by said lever, means engaging the dog for operating said starting and stopping lever, and devices carried by said reciprocating bar for controlling the position of the dog.

6. In a machine for applying bands to cigars, the combination with band-applying devices, of means for feeding cigars to the band-applying devices, a lever for starting, and stopping the machine, a vertically moving dog, means engaging the dog for operating the starting and stopping lever, a rod engaging the dog and controlling its position, a lever for actuating said rod, and means operated by the cigars for actuating said last-mentioned lever.

7. In a machine for applying bands to cigars, the combination with band-applying devices, of means for feeding cigars to the band-applying devices, a lever for starting, and stopping the machine, a recessed disk, a dog carried by said starting and stopping lever and operated by said disk, a recessed rod adapted to engage the dog and having a lip and tongue for holding the dog out of the recess of the disk, means for adjusting the position of the tongue in the recess of the bar, and mechanism operated by the cigars for operating said bar.

8. In a machine for applying bands to cigars, the combination with band-applying devices, of means for feeding cigars to the band-applying devices, a lever for starting, and stopping the machine, a recessed disk, a dog carried by the starting and stopping lever and actuated by said disk, a recessed reciprocating bar having a lip and a tongue at opposite ends of the recess, a yielding connection between said reciprocating bar and said lever, and means actuated by the cigars for operating said reciprocating bar.

9. In a cigar-banding machine, the combination with band-applying devices, of means for feeding rows of cigars, means for carrying cigars one at a time from a row to the band-applying devices, an adjustable abutment adapted to engage the cigars while being fed, a swinging lever operated by the cigars, means carried by said swinging lever and engaging said abutment for holding the abutment and lever in proper relation to the cigars, and means operated by said lever for automatically stopping the machine.

10. In a cigar-banding machine, the combination with means for feeding rows of cigars without turning the individual cigars or otherwise disarranging their relation, band-applying devices, means for carrying cigars one at a time from a row without turning them to the band-applying devices, means which receive the banded cigars one at a time from the band-applying devices and move them to delivery mechanism, and delivery mechanism which receives cigars one at a time from the transfer mechanism and arranges them in rows.

11. In a cigar banding machine, the combination with band applying devices, of gripping jaws which receive banded cigars therefrom one at a time and transfer them independently to delivery mechanism, and delivery mechanism which receives the cigars one at a time from the transfer mechanism and arranges them in rows.

12. In a cigar-banding machine, the combination with band-applying devices, of the devices for straightening cigars while in the band-applying devices, means for transferring the cigars after being strightened to delivery mechanism, and delivery mechanism which receives cigars from the transfer mechanism and arranges them in rows.

13. In a machine for applying bands to cigars, the combination with band-applying devices, of mechanism which receives cigars one at a time from the band-applying devices and transfers them to delivery mechanism, means for moving the transfer mechanism in the arc of a circle from the band applying devices to the delivery mechanism, and curved guides coöperating with said transfer mechanism while cigars are being transferred.

14. In a cigar-banding machine, the combination with band-applying devices of transferring mechanism, comprising an oscillating shaft, levers carried thereby, a sliding jaw and a pivoted jaw carried by each lever, means for operating said jaws to engage a cigar delivered by the band-applying devices, delivery mechanism, and means operated by said oscillating shaft to move said jaw-carrying levers from the band-applying devices to the delivery mechanism.

15. In a cigar-banding machine, the combination with band-applying devices, of an oscillating shaft, a lever mounted thereon, jaws adapted to grasp cigars carried by said lever, a lever keyed to said oscillating shaft, and dogs on said last-mentioned lever for operating the pivoted jaw and for moving said jaws from the band-applying devices to the delivery mechanism.

16. The combination with an oscillating shaft of a lever, a sliding jaw carried thereby, a pivoted jaw carried by said lever and coöperating with the sliding jaw, a spring for normally holding the sliding jaw in its projected position, a spring for normally holding the pivoted jaw in position to grasp a cigar, and means for adjusting the tension of said last-mentioned spring.

17. In a cigar-banding machine, the combination with band-applying devices of delivery mechanism and mechanism for transferring cigars one at a time from the band-applying devices to the delivery mechanism, comprising an oscillating shaft, levers carried thereby, jaws carried by said levers, means carried by the shaft for moving said levers toward and from the band-applying devices, and devices for opening and closing the jaws at proper intervals.

18. The combination with band-applying devices, of cigar-delivery mechanism, and mechanism for transferring cigars from the band-applying devices to the delivery mechanism, comprising an oscillating shaft, levers mounted thereon, cigar-grasping jaws carried by said levers, means for moving said levers from the band-applying devices to the cigar-delivery mechanism, means for operating the jaws to engage cigars delivered by the band-applying devices, means for opening the jaws when they reach the delivery mechanism, and means for holding the jaws temporarily in their elevated position while the delivery mechanism is operating.

19. In a cigar-banding machine the combination with band-applying devices, of cigar-delivery mechanism, and mechanism for transferring cigars from the band-applying devices to the delivery mechanism, comprising an oscillating shaft, levers carried thereby, sliding and pivoted jaws carried by said levers, means carried by the oscillating shaft for raising and lowering said levers, cams for operating the sliding jaws in one direction, springs for operating the jaws in the opposite direction, and means for operating the pivoted jaws to open them when they are opposite the delivery mechanism.

20. In a cigar-banding machine, the combination with band-applying devices, of means for receiving cigars one at a time from the band-applying devices and for conveying them away from said band-applying devices, and delivery mechanism, comprising a platform and a reciprocating rake which engages cigars one at a time brought to it by the transfer mechanism and moves them onto the platform.

21. The delivery mechanism herein described, comprising a platform, a reciprocating rake which receives cigars and moves them onto the platform, and an oscillating gate for closing the entrance to the platform.

22. The combination with band-applying devices, of transfer mechanism, comprising jaws which grasp cigars one at a time and carry them away from the band-applying devices, and delivery mechanism, comprising a reciprocating rake which receives cigars delivered by the transfer mechanism and disengages them therefrom.

23. The delivery mechanism herein described, comprising a cigar-receiving platform, a reciprocating rake operating over said platform, an oscillating gate adapted to close the entrance to said platform, and a spring bearing on the cigars received by the platform.

24. In a cigar-banding machine the combination with band-applying devices, of transfer mechanism, comprising jaws which grasp cigars one at a time and carry them away from the band-applying devices, and delivery mechanism, comprising a platform, a reciprocating rake for moving cigars from said jaws onto the platform, and a spring bearing on cigars while in the jaws and while being moved by the rake to the platform.

25. In a cigar-banding machine, the combination with band-applying devices, of delivery mechanism, mechanism for transferring cigars one at a time from the band-applying devices to the delivery mechanism, and devices for straightening the cigars before passing from the band-applying devices to the transfer mechanism comprising pivoted fingers and mechanism for operating them.

In testimony whereof, I have hereunto subscribed my name.

WILLIAM CYRUS BRIGGS.

Witnesses:
L. W. LAWRENCE,
M. H. WILLIS.